(12) United States Patent
Ishisaka

(10) Patent No.: US 6,289,126 B1
(45) Date of Patent: Sep. 11, 2001

(54) METHOD AND APPARATUS FOR DETERMINING THE BOUNDARY OF AN OBJECT

(75) Inventor: Masaki Ishisaka, Himeji (JP)

(73) Assignee: Sysmex Corporation, Hyogo (JP)

( * ) Notice: Subject to any disclaimer, the term of this patent is extended or adjusted under 35 U.S.C. 154(b) by 0 days.

(21) Appl. No.: 09/131,375

(22) Filed: Aug. 7, 1998

(30) Foreign Application Priority Data

Aug. 13, 1997 (JP) ................................... 9-218731

(51) Int. Cl.⁷ ....................................... G06K 9/56
(52) U.S. Cl. ............................................. 382/205
(58) Field of Search ................................ 382/205, 250, 382/266, 263, 232, 233, 235

(56) References Cited

U.S. PATENT DOCUMENTS

| | | | |
|---|---|---|---|
| 3,899,771 | * 8/1975 | Saraga et al. | 340/146.3 |
| 4,060,713 | * 11/1977 | Golay | 364/416 |
| 4,538,299 | * 8/1985 | Deforest | 382/21 |
| 5,220,647 | 6/1993 | Kumagai . | |
| 5,694,487 | * 12/1997 | Lee | 382/201 |
| 5,719,958 | * 2/1998 | Wober et al. | 382/199 |

FOREIGN PATENT DOCUMENTS

| | | |
|---|---|---|
| 63-301372 | 12/1988 | (JP) . |
| 5-71991 | 10/1993 | (JP) . |

* cited by examiner

*Primary Examiner*—Andrew W. Johns
*Assistant Examiner*—Seyed Azarian

(57) ABSTRACT

The boundary of an object is determined based on its optically captured image by: (a) converting a density data of each of a plurality of pixels forming the captured image into a binary signal; (b) converting the binary signal into a neighbor pixel state value so that only the pixels located on the boundary r in the interior of the object have a value corresponding to the binary signals of the surrounding pixels; (c) normalizing the neighbor pixel state value using an absolute chain direction value of a previous chain direction; (d) obtaining a relative chain direction value for a pixel located on the boundary of the object in the image relative to the direction from which the chain has proceeded, with reference to the neighbor pixel state value of the pixel; (e) calculating an absolute chain direction value of a next chain direction on the basis of the relative chain direction value; and (f) repeating the steps (c) to (e) for each pixel located on the boundary to trace the boundary of the object for determining the boundary.

20 Claims, 22 Drawing Sheets

FIG. 2

| n3 | n2 | n1 |
|----|----|----|
| n4 | n8 | n0 |
| n5 | n6 | n7 |

FIG. 3

| | n2 | |
|---|---|---|
| n3 — 1 | 0 | 0 — n1 |
| n4 — 1 | 1 | 0 — n0 |
| n5 — 1 | 1 | 1 — n7 |
| | n6 | |

| 0 | 0 | 0 |
|---|---|---|
| 0 | 1 | 0 |
| 1 | 1 | 1 |

FIG. 7(b)

| 0 | 0 | 0 |
|---|---|---|
| 0 | 1 | 1 |
| 0 | 1 | 1 |

FIG. 7(c)

| 0 | 0 | 1 |
|---|---|---|
| 0 | 1 | 1 |
| 0 | 0 | 1 |

FIG. 7(d)

| 0 | 1 | 1 |
|---|---|---|
| 0 | 1 | 1 |
| 0 | 0 | 0 |

FIG. 7(e)

| 1 | 1 | 1 |
|---|---|---|
| 0 | 1 | 0 |
| 0 | 0 | 0 |

FIG. 7(f)

| 1 | 1 | 0 |
|---|---|---|
| 1 | 1 | 0 |
| 0 | 0 | 0 |

FIG. 7(g)

| 1 | 0 | 0 |
|---|---|---|
| 1 | 1 | 0 |
| 1 | 0 | 0 |

FIG. 7(h)

| 0 | 0 | 0 |
|---|---|---|
| 1 | 1 | 0 |
| 1 | 1 | 0 |

FIG. 8

| n3 | n2 | n1 |
|----|----|----|
| n4 |    | n0 |
| n5 | n6 | n7 |

FIG. 9(a)
PREVIOUS CHAIN CODE=0

| n3 | n2 | n1 |
|----|----|----|
| n4 |    | n0 |
| n5 | n6 | n7 |

FIG. 9(b)
PREVIOUS CHAIN CODE=1

| n2 | n1 | n0 |
|----|----|----|
| n3 |    | n7 |
| n4 | n5 | n6 |

FIG. 9(c)
PREVIOUS CHAIN CODE=2

| n1 | n0 | n7 |
|----|----|----|
| n2 |    | n6 |
| n3 | n4 | n5 |

FIG. 9(d)
PREVIOUS CHAIN CODE=3

| n0 | n7 | n6 |
|----|----|----|
| n1 |    | n5 |
| n2 | n3 | n4 |

FIG. 9(e)
PREVIOUS CHAIN CODE=4

| n7 | n6 | n5 |
|----|----|----|
| n0 |    | n4 |
| n1 | n2 | n3 |

FIG. 9(f)
PREVIOUS CHAIN CODE=5

| n6 | n5 | n4 |
|----|----|----|
| n7 |    | n3 |
| n0 | n1 | n2 |

FIG. 9(g)
PREVIOUS CHAIN CODE=6

| n5 | n4 | n3 |
|----|----|----|
| n6 |    | n2 |
| n7 | n0 | n1 |

FIG. 9(h)
PREVIOUS CHAIN CODE=7

| n4 | n3 | n2 |
|----|----|----|
| n5 |    | n1 |
| n6 | n7 | n0 |

FIG. 14

| NORMALIZED NEIGHBOR PIXEL VALUE (n7,n6,n5,n4,n3,n2,n1,n0) | RELATIVE CHAIN DIRECTION VALUE (d2,d1,d0) |
|---|---|
| 0x10 | 4 (1,0,0) |
| 0x11 | 0 (0,0,0) |
| 0x12 | 1 (0,0,1) |
| 0x13 | 0 (0,0,0) |
| 0x14 | 2 (0,1,0) |
| 0x15 | 0 (0,0,0) |
| 0x16 | 1 (0,0,1) |
| 0x17 | 0 (0,0,0) |
| 0x18 | 3 (0,1,1) |
| 0x19 | 0 (0,0,0) |
| 0x1A | 1 (0,0,1) |
| 0x1B | 0 (0,0,0) |
| 0x1C | 2 (0,1,0) |
| 0x1D | 0 (0,0,0) |
| 0x1E | 1 (0,0,1) |
| 0x1F | 0 (0,0,0) |
| 0x5X | 6 (1,1,0) |
| 0x9X | 7 (1,1,1) |
| 0xDX | 6 (1,1,0) |

(WHERE 0x IS A SYMBOL FOR INTRODUCING A HEXADECIMAL NUMBER AND X REPRESENTS A REDUNDANCY.)

FIG. 19

| 9 | 0 | 3 | 4 | 5 | 7 | 16 | 6 | 8 | 19 | 8 | 11 |
|---|---|---|---|---|---|----|---|---|----|----|----|
| 8 | 11 | 6 | 16 | 7 | 18 | 10 | 7 | 11 | 9 | 14 | 15 |
| 2 | 14 | 13 | 8 | 8 | 3 | 29 | 17 | 15 | 14 | 11 | 5 |
| 11 | 14 | 3 | 0 | 12 | 29 | 39 | 28 | 12 | 13 | 16 | 2 |
| 2 | 8 | 15 | 9 | 31 | 35 | 40 | 33 | 11 | 2 | 16 | 19 |
| 15 | 11 | 12 | 17 | 32 | 35 | 40 | 35 | 6 | 5 | 19 | 3 |
| 17 | 2 | 1 | 32 | 31 | 44 | 50 | 43 | 8 | 0 | 9 | 2 |
| 15 | 10 | 18 | 32 | 50 | 40 | 45 | 42 | 9 | 2 | 1 | 18 |
| 7 | 1 | 19 | 13 | 33 | 38 | 36 | 12 | 15 | 1 | 1 | 14 |
| 6 | 18 | 1 | 6 | 9 | 2 | 15 | 15 | 9 | 3 | 17 | 14 |
| 13 | 11 | 14 | 15 | 11 | 14 | 13 | 10 | 1 | 0 | 11 | 12 |
| 0 | 17 | 19 | 14 | 12 | 12 | 2 | 7 | 18 | 17 | 13 | 12 |

FIG. 20

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 |
| 0 | 0 | 0 | 0 | 0 | 1 | 1 | 1 | 0 | 0 | 0 | 0 |
| 0 | 0 | 0 | 0 | 1 | 1 | 1 | 1 | 0 | 0 | 0 | 0 |
| 0 | 0 | 0 | 0 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 0 | 1 | 1 | 1 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | E0 | 0 | 0 | 0 | 0 | 0 |
| 0 | 0 | 0 | 0 | 0 | E3 | F5 | 78 | 0 | 0 | 0 | 0 |
| 0 | 0 | 0 | 0 | C3 | F7 | FF | 7C | 0 | 0 | 0 | 0 |
| 0 | 0 | 0 | 0 | E7 | FF | FF | 7C | 0 | 0 | 0 | 0 |
| 0 | 0 | 0 | C3 | F7 | FF | FF | 7C | 0 | 0 | 0 | 0 |
| 0 | 0 | 0 | 87 | DF | FF | 7F | 3C | 0 | 0 | 0 | 0 |
| 0 | 0 | 0 | 0 | 0F | 1F | 1E | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 28(d)

PARTICLE DIAMETER FREQUENCY DATA TABLE (57 RANGES)

| PARTICLE DIAMETER | CUMULATIVE FREQUENCY(%) | FREQUENCY(%) | PARTICLE DIAMETER | CUMULATIVE FREQUENCY(%) | FREQUENCY(%) | PARTICLE DIAMETER | CUMULATIVE FREQUENCY(%) | FREQUENCY(%) | PARTICLE DIAMETER | CUMULATIVE FREQUENCY(%) | FREQUENCY(%) |
|---|---|---|---|---|---|---|---|---|---|---|---|
| 0.60 | 1.86 | 1.86 | 3.37 | 52.10 | 0.31 | 18.94 | 99.87 | 0.08 | 106.4 | 100.00 | 0.00 |
| 0.67 | 4.46 | 2.61 | 3.78 | 52.21 | 0.10 | 21.25 | 99.87 | 0.00 | 119.4 | 100.00 | 0.00 |
| 0.75 | 7.53 | 3.07 | 4.24 | 52.90 | 0.70 | 23.84 | 99.90 | 0.03 | 134.0 | 100.00 | 0.00 |
| 0.84 | 11.68 | 4.15 | 4.76 | 54.27 | 1.37 | 26.75 | 100.00 | 0.10 | 150.3 | 100.00 | 0.00 |
| 0.95 | 16.28 | 4.59 | 5.34 | 57.03 | 2.76 | 30.01 | 100.00 | 0.00 | 168.6 | 100.00 | 0.00 |
| 1.06 | 20.94 | 4.67 | 5.99 | 61.16 | 4.13 | 33.67 | 100.00 | 0.00 | 189.2 | 100.00 | 0.00 |
| 1.19 | 25.72 | 4.77 | 6.72 | 66.52 | 5.36 | 37.78 | 100.00 | 0.00 | 212.3 | 100.00 | 0.00 |
| 1.34 | 31.31 | 5.60 | 7.54 | 72.92 | 6.40 | 42.39 | 100.00 | 0.00 | 238.2 | 100.00 | 0.00 |
| 1.50 | 37.37 | 6.06 | 8.46 | 80.50 | 7.58 | 47.56 | 100.00 | 0.00 | 267.2 | 100.00 | 0.00 |
| 1.69 | 42.71 | 5.34 | 9.49 | 87.54 | 7.04 | 53.36 | 100.00 | 0.00 | 299.8 | 100.00 | 0.00 |
| 1.89 | 46.25 | 3.53 | 10.65 | 93.16 | 5.62 | 59.86 | 100.00 | 0.00 | 336.4 | 100.00 | 0.00 |
| 2.12 | 48.52 | 2.27 | 11.95 | 97.06 | 3.89 | 67.16 | 100.00 | 0.00 | 377.4 | 100.00 | 0.00 |
| 2.38 | 50.40 | 1.88 | 13.41 | 98.97 | 1.91 | 75.36 | 100.00 | 0.00 | | | |
| 2.67 | 51.33 | 0.93 | 15.04 | 99.59 | 0.62 | 84.55 | 100.00 | 0.00 | | | |
| 3.00 | 51.79 | 0.46 | 16.88 | 99.79 | 0.21 | 94.86 | 100.00 | 0.00 | | | |

FIG. 28(e)

RESULT OF ANALYSIS (PARTICLE SIZE/CIRCULARITY)

| | | | |
|---|---|---|---|
| MEAN DIAMETER | = 5.13 | DIAMETER CV | = 84.32 % |
| MODAL DIAMETER | = 8.84 | PARTICLE CONCENTRATION | = 12923.3 |
| 90% DIAMETER | = 11.25 | SELECTED PARTICLE RATIO | = 100.00 % |
| 50% DIAMETER | = 2.56 | LARGE PARTICLE RATIO | = 0.00 % |
| 10% DIAMETER | = 0.89 | MIDDLE PARTICLE RATIO | = 100.00 % |
| DIAMETER SD | = 4.32 | SMALL PARTICLE RATIO | = 0.00 % |
| | | MEAN CIRCULARITY | = 0.947 |
| | | MODAL CIRCULARITY | = 1.000 |
| | | 50% CIRCULARITY | = 0.950 |
| | | CIRCULARITY SD | = 0.047 |
| | | CIRCULARITY CV | = 4.97 % |
| | | CIRCULARITY<0.85 | = 2.67 % |

FIG. 29(d)

PARTICLE DIAMETER FREQUENCY DATA TABLE (57 RANGES)

| PARTICLE DIAMETER | CUMU-LATIVE FRE-QUENCY(%) | FREQUEN-CY(%) | PARTICLE DIAMETER | CUMU-LATIVE FRE-QUENCY(%) | FREQUEN-CY(%) | PARTICLE DIAMETER | CUMU-LATIVE FRE-QUENCY(%) | FREQUEN-CY(%) | PARTICLE DIAMETER | CUMU-LATIVE FRE-QUENCY(%) | FREQUEN-CY(%) |
|---|---|---|---|---|---|---|---|---|---|---|---|
| 0.60 | 0.00 | 0.00 | 3.37 | 0.90 | 0.07 | 18.94 | 100.00 | 0.00 | 106.4 | 100.00 | 0.00 |
| 0.67 | 0.00 | 0.00 | 3.78 | 1.02 | 0.13 | 21.25 | 100.00 | 0.00 | 119.4 | 100.00 | 0.00 |
| 0.75 | 0.01 | 0.00 | 4.24 | 1.34 | 0.31 | 23.84 | 100.00 | 0.00 | 134.0 | 100.00 | 0.00 |
| 0.84 | 0.01 | 0.01 | 4.76 | 2.07 | 0.73 | 26.75 | 100.00 | 0.00 | 150.3 | 100.00 | 0.00 |
| 0.95 | 0.02 | 0.01 | 5.34 | 4.10 | 2.04 | 30.01 | 100.00 | 0.00 | 168.6 | 100.00 | 0.00 |
| 1.06 | 0.05 | 0.02 | 5.99 | 9.12 | 5.02 | 33.67 | 100.00 | 0.00 | 189.2 | 100.00 | 0.00 |
| 1.19 | 0.08 | 0.03 | 6.72 | 19.19 | 10.07 | 37.78 | 100.00 | 0.00 | 212.3 | 100.00 | 0.00 |
| 1.34 | 0.13 | 0.05 | 7.54 | 33.27 | 14.08 | 42.39 | 100.00 | 0.00 | 238.2 | 100.00 | 0.00 |
| 1.50 | 0.21 | 0.08 | 8.46 | 49.31 | 16.04 | 47.56 | 100.00 | 0.00 | 267.2 | 100.00 | 0.00 |
| 1.69 | 0.32 | 0.11 | 9.49 | 65.43 | 16.11 | 53.36 | 100.00 | 0.00 | 299.8 | 100.00 | 0.00 |
| 1.89 | 0.43 | 0.11 | 10.65 | 80.75 | 15.32 | 59.86 | 100.00 | 0.00 | 336.4 | 100.00 | 0.00 |
| 2.12 | 0.54 | 0.10 | 11.95 | 92.42 | 11.66 | 67.16 | 100.00 | 0.00 | 377.4 | 100.00 | 0.00 |
| 2.38 | 0.65 | 0.11 | 13.41 | 97.52 | 5.11 | 75.36 | 100.00 | 0.00 | | | |
| 2.67 | 0.75 | 0.11 | 15.04 | 98.92 | 1.40 | 84.55 | 100.00 | 0.00 | | | |
| 3.00 | 0.83 | 0.08 | 16.88 | 100.00 | 1.08 | 94.86 | 100.00 | 0.00 | | | |

FIG. 29(e)

RESULT OF ANALYSIS (PARTICLE SIZE/CIRCULARITY)

MEAN DIAMETER = 9.75　　　DIAMETER CV = 26.12 %　　　MEAN CIRCULARITY = 0.949
MODAL DIAMETER = 10.81　　PARTICLE CONCENTRATION = 32746.7　　MODAL CIRCULARITY = 1.000
90% DIAMETER = 13.37　　　SELECTED PARTICLE RATIO = 100.00 %　　50% CIRCULARITY = 0.950
50% DIAMETER = 9.63　　　LARGE PARTICLE RATIO = 0.00 %　　CIRCULARITY SD = 0.046
10% DIAMETER = 6.74　　　MIDDLE PARTICLE RATIO = 100.00 %　　CIRCULARITY CV = 4.86 %
DIAMETER SD = 2.55　　　SMALL PARTICLE RATIO = 0.00 %　　CIRCULARITY<0.85 = 2.90 %

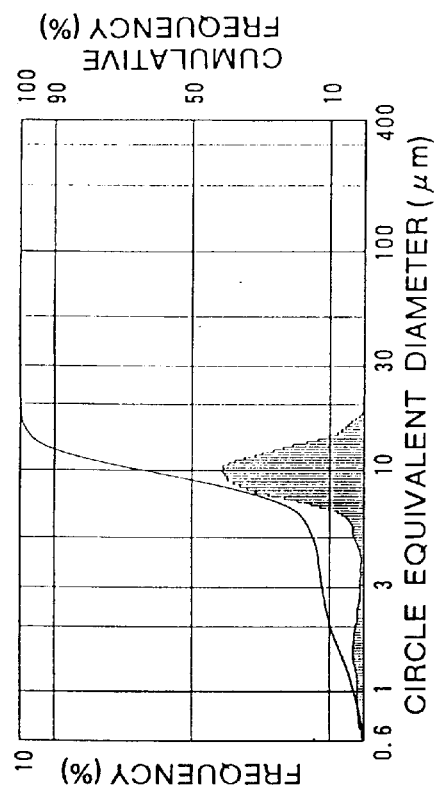
FIG. 30(a)
FIG. 30(b)
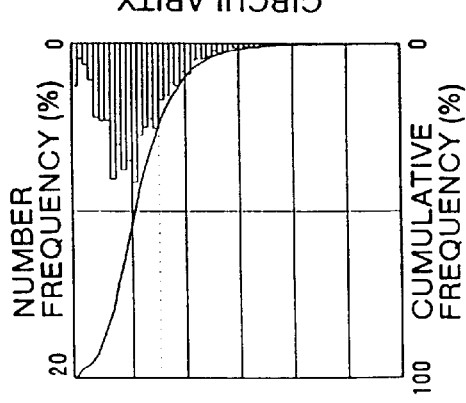
FIG. 30(c)

FIG. 30(d)

PARTICLE DIAMETER FREQUENCY DATA TABLE (57 RANGES)

| PARTICLE DIAMETER | CUMULATIVE FREQUENCY(%) | FREQUENCY(%) | PARTICLE DIAMETER | CUMULATIVE FREQUENCY(%) | FREQUENCY(%) | PARTICLE DIAMETER | CUMULATIVE FREQUENCY(%) | FREQUENCY(%) | PARTICLE DIAMETER | CUMULATIVE FREQUENCY(%) | FREQUENCY(%) |
|---|---|---|---|---|---|---|---|---|---|---|---|
| 0.60 | 0.33 | 0.33 | 3.37 | 12.94 | 0.45 | 18.94 | 99.96 | 0.13 | 106.4 | 100.00 | 0.00 |
| 0.67 | 0.96 | 0.64 | 3.78 | 13.36 | 0.42 | 21.25 | 100.00 | 0.04 | 119.4 | 100.00 | 0.00 |
| 0.75 | 1.68 | 0.72 | 4.24 | 14.02 | 0.66 | 23.84 | 100.00 | 0.00 | 134.0 | 100.00 | 0.00 |
| 0.84 | 2.45 | 0.77 | 4.76 | 15.21 | 1.19 | 26.75 | 100.00 | 0.00 | 150.3 | 100.00 | 0.00 |
| 0.95 | 3.28 | 0.83 | 5.34 | 16.68 | 1.48 | 30.01 | 100.00 | 0.00 | 168.6 | 100.00 | 0.00 |
| 1.06 | 4.15 | 0.87 | 5.99 | 19.11 | 2.43 | 33.67 | 100.00 | 0.00 | 189.2 | 100.00 | 0.00 |
| 1.19 | 5.18 | 1.03 | 6.72 | 24.93 | 5.81 | 37.78 | 100.00 | 0.00 | 212.3 | 100.00 | 0.00 |
| 1.34 | 6.47 | 1.29 | 7.54 | 36.53 | 11.61 | 42.39 | 100.00 | 0.00 | 238.2 | 100.00 | 0.00 |
| 1.50 | 7.78 | 1.31 | 8.46 | 51.84 | 15.31 | 47.56 | 100.00 | 0.00 | 267.2 | 100.00 | 0.00 |
| 1.69 | 8.97 | 1.19 | 9.49 | 68.14 | 16.30 | 53.36 | 100.00 | 0.00 | 299.8 | 100.00 | 0.00 |
| 1.89 | 10.00 | 1.03 | 10.65 | 82.44 | 14.29 | 59.86 | 100.00 | 0.00 | 336.4 | 100.00 | 0.00 |
| 2.12 | 10.84 | 0.84 | 11.95 | 92.42 | 9.99 | 67.16 | 100.00 | 0.00 | 377.4 | 100.00 | 0.00 |
| 2.38 | 11.49 | 0.66 | 13.41 | 97.24 | 4.82 | 75.36 | 100.00 | 0.00 | | | |
| 2.67 | 12.00 | 0.50 | 15.04 | 99.31 | 2.07 | 84.55 | 100.00 | 0.00 | | | |
| 3.00 | 12.49 | 0.49 | 16.88 | 99.83 | 0.51 | 94.86 | 100.00 | 0.00 | | | |

FIG. 30(e)

RESULT OF ANALYSIS (PARTICLE SIZE/CIRCULARITY)

MEAN DIAMETER      = 8.92
MODAL DIAMETER     = 9.91
90% DIAMETER       = 12.99
50% DIAMETER       = 9.35
10% DIAMETER       = 2.13
DIAMETER SD        = 3.64

DIAMETER CV               = 40.80 %
PARTICLE CONCENTRATION    = 32510.0
SELECTED PARTICLE RATIO   = 100.00 %
LARGE PARTICLE RATIO      = 0.00 %
MIDDLE PARTICLE RATIO     = 100.00 %
SMALL PARTICLE RATIO      = 0.00 %

MEAN CIRCULARITY      = 0.884
MODAL CIRCULARITY     = 0.890
50% CIRCULARITY       = 0.890
CIRCULARITY SD        = 0.070
CIRCULARITY CV        = 7.89 %
CIRCULARITY<0.85      = 22.38 %

METHOD AND APPARATUS FOR DETERMINING THE BOUNDARY OF AN OBJECT

CROSS-REFERENCES TO RELATED APPLICATIONS

This application is related to Japanese Patent Application No. HEI 09(1997)-218731 filed on Aug. 13, 1997 whose priority is claimed under 35 USC §119, the disclosure of which is incorporated herein by reference in its entirety.

BACKGROUND OF THE INVENTION

1. Field of the Invention

The present invention relates to a method and an apparatus for determining the boundary of an object and a storage medium containing a program for determining the boundary of an object. More particularly, the present invention relates to a method and apparatus for determining the boundary of an object by capturing an image of a particle such as a blood corpuscle or a cell through a microscope using a video camera or the like, storing the image in an image memory, and determining the boundary of the stored particle by image processing, and a storage medium containing a program for determining the boundary of an object.

2. Description of the Related Art

Generally, a characteristic property or a tendency of an object can be found by determining its shape. For example, a state of a living body can be found by examining a shape of a blood corpuscle or a cell contained in blood or urine. For this purpose, an image of a blood corpuscle or a cell (usually referred to as a "particle) is captured and a shape of the blood corpuscle or the cell is analyzed by image processing. Through this analysis, the outline (also referred to as the "edge" or the "boundary") of the particle is traced to calculate a perimeter or an area (characteristic parameter) of the particle, whereby the shape of the particle is numerically determined.

Conventional methods of analyzing a region in an image by observing its boundary are disclosed, for example, in "Method and Apparatus for Determining the Boundary of an Object" of Japanese Examined Patent Publication No. HEI 5(1993)-71991 (U.S. Pat. No. 4,538,299 issued on Aug. 27, 1985) and in "Image Processing Apparatus" of Japanese Unexamined Patent Publication No. SHO 63(1988)-301372 (U.S. Pat. No. 5,220,647 issued on Jun. 15, 1993).

According to the method disclosed in Japanese Examined Patent Publication No. HEI 5(1993)-71991, the following steps are carried out to trace the boundary of an object by image processing, as shown in FIG. 27.

Step 1:

An image of an object such as a blood corpuscle or a cell is captured. The captured image is subjected to A/D conversion to convert the luminance of each pixel into a multi-valued image (gray-scale image), which is then stored in a frame (image) memory. This gray-scale image is referred to as a first representation.

Step 2:

A threshold value is set so as to distinguish the object from background noises. By means of this threshold value, the multi-valued image is converted into a binary image, which is then stored in a different frame memory. This binary image is referred to as a second representation.

Step 3:

For each object pixel in the binary image, values of the object pixel and the 8-neighbor pixels adjacent to the object pixel in the surrounding eight directions are taken out and converted by means of a look-up table into a single value, which is then stored in another frame memory. Thus, a third representation of the image is formed. Through this step, only the pixels on the boundary of an object are allowed to have a non-zero value, and the pixels on the inside and outside of the object are allowed to have a value of "0".

Step 4:

The image of the third representation is raster-scanned to search for a pixel having a non-zero value. Once a pixel having a non-zero value is found, reference is made to a look-up table by using as parameters the value and the direction from which the scanning has proceeded in order to arrive at the pixel, thereby to determine the direction where the next pixel having a nonzero value would be found. Every time a pixel on the boundary portion is traced, the content of the memory of the third representation corresponding to the pixel is cleared to zero. The pixels on the boundary portion are traced while the content of the next pixel to be chained to in the third representation is non-zero. If the content of the next pixel to be chained to is zero, it is assumed that the trace of all the pixels on the boundary portion has been completed, and the trace of the boundary is ended. In this way, the boundary of the object is traced to obtain a chain code in the end.

According to the method disclosed in Japanese Unexamined Patent Publication No. SHO 63(1988)-301372, the following steps are carried out to trace the boundary of an object by image processing.

The above steps 1 to 3 are carried out in the same manner as in Japanese Examined Patent Publication No. HEI 05(1993)-71991. With respect to a pixel value in the third representation obtained in the step 3, a chain direction is searched for from the (k+2)th digit (if k is odd) or from the (k+3)th digit (if k is even) in a direction of increasing k, where k is the direction of the previous pixel. The digit which has been found out to have a value of "1" is decided as a chain code to trace the boundary.

In the prior art, image processing has been carried out by employing these methods to trace the boundary of an object.

However, the above edge-tracing method disclosed in Japanese Examined Patent Publication No. HEI 05(1993)-71991 frequently uses a look-up table and the logic circuit has a comparatively large dimension. Also, PROM to be used for table look-up operates in a comparatively low speed as a logic circuit. Accordingly, it has been difficult to achieve great improvements in boundary tracing circuits regarding the speed and the cost.

The edge-tracing method disclosed in Japanese Unexamined Patent Publication No. SHO 63(1988)-301372 requires a number of steps in searching for the tracing direction, so that it is difficult to achieve great improvements in the speed of the process.

SUMMARY OF THE INVENTION

The present invention has been made in view of these circumstances and the purpose thereof is to provide a method and apparatus for determining the boundary of an object wherein the boundary of the object in an image captured with a video camera through a microscope or the like can be traced in a high speed with a smaller circuit dimension, and a storage medium containing a program for determining the boundary of an object.

Accordingly, the present invention provides a method for determining the boundary of an object based on its optically captured image, comprising the steps of: (a) converting a density data of each of a plurality of pixels forming the captured image into a binary signal; (b) converting the binary signal into a neighbor pixel state value so that only the pixels located on the boundary or in the interior of the object have a value corresponding to the binary signals of the surrounding pixels; (c) obtaining a relative chain direction value for a pixel located on the boundary of the object in the image relative to the direction from which the chain has proceeded, with reference to the neighbor pixel state value of the pixel; (d) calculating an absolute chain direction value of a next chain direction on the basis of the relative chain direction value; and (e) repeating the steps (c) to (d) for each pixel located on the boundary to trace the boundary of the object for determining the boundary.

According to the present invention, in tracing the boundary of an object, an absolute chain direction value of a next chain direction is calculated by determining a relative chain direction value for a pixel located on the boundary of the object relative to the direction from which the chain has proceeded. Therefore, the boundary of the object in an image can be traced in a high speed with a smaller circuit dimension as compared with a conventional method employing a look-up table.

BRIEF DESCRIPTION OF THE DRAWINGS

The present invention will be better understood from the following detailed description of preferred embodiments of the invention, taken in conjunction with the accompanying drawings, in which:

FIG. 2 is an explanatory view showing a definition of 8-neighbor pixels for an object pixel according to the present invention;

FIG. 3 is an explanatory view showing an example of a binary state of the 8-neighbor pixels including the object pixel according to the present invention;

FIGS. 7(a) to 7(h) are explanatory views showing a symmetry of 8-neighbor pixels for an object pixel according to the present invention;

FIG. 8 is an explanatory view showing a bit configuration of the values of the 8-neighborhood pixels according to the present invention;

FIGS. 9(a) to 9(h) are explanatory views of states in which the values of the 8-neighbor pixels have been shifted according to the present invention;

FIG. 14 is an explanatory view showing truth values of logic operation in the first logic unit according to the present invention;

FIG. 19 is an explanatory view of an example of a gray-scale image according to the present invention;

FIG. 20 is an explanatory view of an example of stored contents in the binary image retaining memory according to the present invention;

FIGS. 28(a) to 28(e) are views showing a result of analysis of a kind of toner particles obtained by means of a flow particle image analyzer of the present invention;

FIGS. 29(a) to 29(e) are views showing a result of analysis of another kind of toner particles obtained by means of the flow particle image analyzer of the present invention; and FIGS. 30(a) to 30(e) are views showing a result of analysis of alumina particles obtained by means of the flow particle image analyzer of the present invention.

DETAILED DESCRIPTION OF THE PREFERRED EMBODIMENTS

Figure 1:
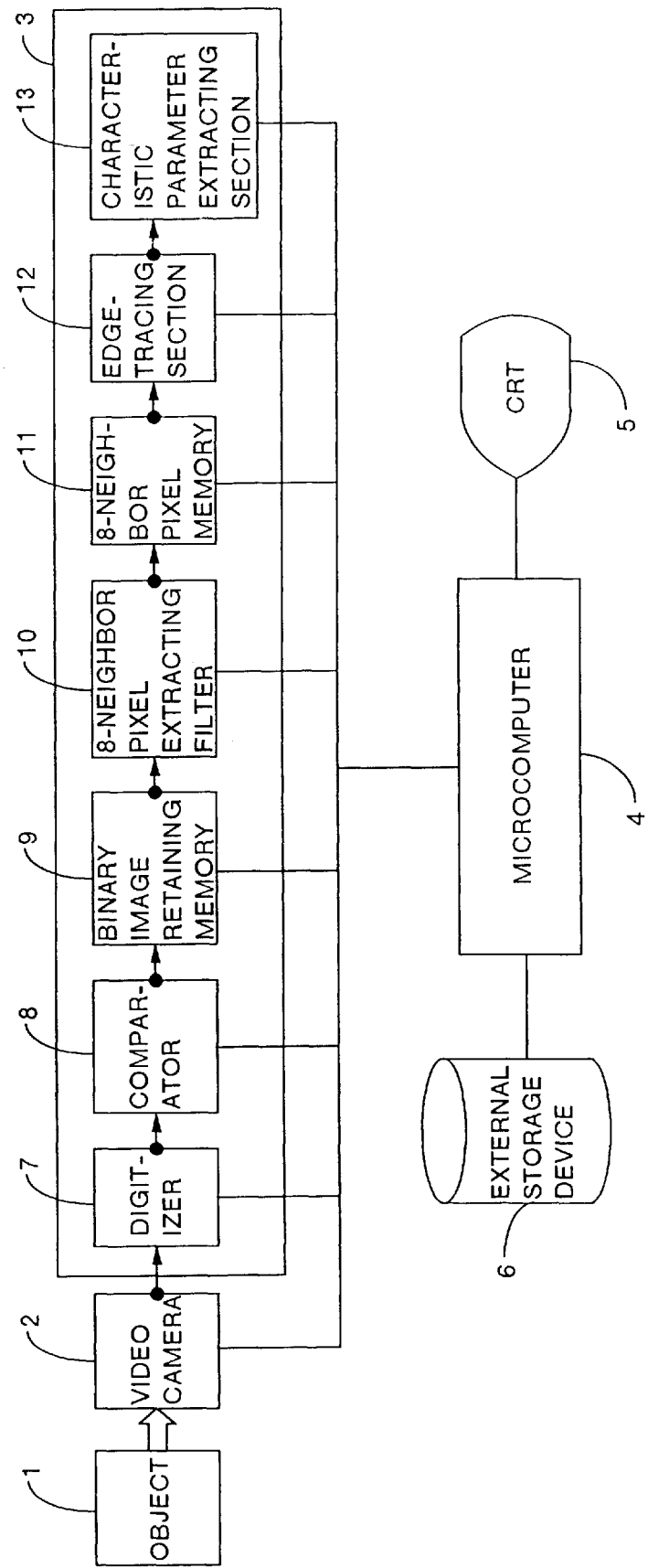
FIG. 1 is a block diagram showing a construction of an apparatus for determining the boundary of an object according to the present invention.

In the method for determining the boundary of an object according to the present invention, the object may comprise industrial particles or powders such as toner particles, or articles from a living body inclusive of a human being, such as blood corpuscles contained in blood or cells contained in urine.

The image which is an object of processing can be obtained by optically capturing the object with a camera or the like. The camera to be used is not specifically limited as long as it is capable of converting the captured image of the object into an electric signal for output, so that it can be an ordinary video camera employing a CCD (Charge Coupling Device).

Thus, if an ordinary video camera is used as the camera, the captured image is outputted as an analogue video signal obtained by scanning a plurality of pixels. Accordingly, conversion of the analogue video signal into a digital signal represented in gray-scale (multi-valued image), conversion of the digital signal into a binary signal, conversion of the binary signal into a neighbor pixel state value, and calculation of the chain direction value can be carried out in an image processor equipped with a microcomputer having a CPU, a ROM, a RAM, and an I/O port.

In the above construction, the absolute chain direction value of the next chain direction may be calculated by adding the relative chain direction value to an absolute chain direction value of a previous chain direction.

In another aspect, the present invention provides an apparatus for determining a boundary of an object based on its optically captured image, comprising: (a) a binarizing section for converting a density data of each of a plurality of pixels forming the captured image into a binary signal; (b) a pixel extracting section for converting the binary signal obtained by a filtration in the binarizing section into a neighbor pixel state value so that only the pixels located on the boundary or in the interior of the object have a value corresponding to the binary signals of the surrounding pixels; and (c) an edge-tracing section for obtaining a relative chain direction value for a pixel located on the boundary of the object in the image relative to the direction from which the chain has proceeded, with reference to the neighbor pixel state value of the pixel obtained by conversion in the pixel extracting section, for calculating an absolute chain direction value of a next chain direction on the basis of the relative chain direction value, and for repeating a process from the step of obtaining the relative chain direction value to the step of calculating the absolute chain direction value for each pixel located on the boundary to trace the boundary of the object for determining the boundary.

In still another aspect, the present invention provides a computer-readable recording medium containing a computer program for causing a computer to execute the processing procedures as described in the above apparatus for determining the boundary of an object.

In a further aspect, the present invention provides a flow particle image analyzer comprising: a flow cell through which particles flow; a light source for applying a light into the flow cell; an image capturing device for capturing images of the particles flowing through the flow cell by means of the light from the light source; an apparatus for determining the boundary of an object according to the present invention; and an analyzer for analyzing a shape of the object on the basis of data obtained by the apparatus for determining the boundary of the object.

Embodiments

The present invention is now detailed by way of embodiments illustrated in the drawings, which are not intended to limit the scope of the present invention.

FIG. 1 is a block diagram showing a construction of an apparatus for determining the boundary of an object. The apparatus is used directly in carrying out the method for determining the boundary of an object according to the present invention.

The apparatus for determining the boundary of an object includes a video camera 2 for capturing an image of an object 1 to be measured, an image processor (an image processing device) 3, a microcomputer 4, a CRT display device 5, and an external storage device 6.

The image processor 3 includes a digitizer 7, a comparator 8, a binary image retaining memory 9, an 8-neighbor pixel extracting filter 10, an 8-neighbor pixel memory 11, an edge-tracing section 12, and a characteristic parameter extracting section 13.

The object 1 to be subjected to measurement may be, for example, a particle flowing in an imaging flow cytometer, such as a blood corpuscle contained in blood or a cell contained in urine.

The imaging flow cytometer is an apparatus for forming a sample flow by introducing a sample liquid obtained by dilution of blood, urine, or the like into a transparent tube referred to as a flow cell, applying a pulse light such as a stroboscopic light or a pulse laser light to the sample flow, and capturing with a video camera an image of a particle (i.e., a particle to be subjected to inspection) such as a blood corpuscle contained in blood or a cell contained in urine. Although the image flow cytometer is not shown in the drawings, it may be used in capturing an image of the object 1 with the video camera 2.

The video camera 2 is an ordinary, commercially available camera and captures an image of the object 1 such as a blood corpuscle or a cell flowing in the imaging flow cytometer via a microscope. Such a video camera 2 employs numerous CCDs corresponding to the number of pixels as photoelectric conversion elements. By means of these CCDs, the video camera 2 performs photoelectric conversion of the image of the object 1 to output an analogue video signal based on the EIA standard.

The digitizer 7 performs A/D conversion on the analogue video signal from the video camera 2. Namely, the analogue video signal is converted into a multi-valued image (gray-scale image) in which the luminance (light intensity) of each pixel is represented by a digital 8-bit signal divided into, for example, 256 grades from 0 to 255. The obtained gray-scale image is outputted sequentially in a raster scan (line sequential scan) order. The value of the multi-valued image will be detailed later.

The information thus outputted from the digitizer 7 may be regarded as a density information of each pixel in the object image, and this information is processed through a binarizing section, an image extracting section, and an edge-tracing section as mentioned later to trace the boundary of the object.

The binarizing section may include, for example, the comparator 8 and the binary image retaining memory 9.

The comparator 8 filters the digital signals represented in gray scale for each pixel into two (binarized) levels with the particles being represented by "1" and the background being represented by "0". The obtained signals are sequentially outputted in raster scan order. In other words, a luminance histogram of the object image of, for example, the particles converted into gray scale is analyzed beforehand to obtain a threshold value suitable for separation (filtration) of the particles from the background. The threshold value is then set in the comparator 8 to filter the digital signals into two levels so that the particles are represented by "1" and the background is represented by "0". This filtration may be such that the particles are represented by "0" and the background is represented by "1".

The binary image retaining memory 9 is a memory for retaining the image binarized into the "particles" and the "background". The binary image retaining memory 9 outputs the binarized data (data represented by "1" and "0") of the object pixel and the eight pixels surrounding the object pixel sequentially in raster scan order. The stored contents of the binary image retaining memory 9 will be detained later.

The pixel extracting section includes, for example, the 8-neighbor pixel extracting filter 10 and the 8-neighbor pixel memory 11.

The 8-neighbor pixel extracting filter 10 picks up all the pixels sequentially as object pixels and performs a logical operation on the two values ("1" and "0") of the 8-neighbor pixels surrounding the object pixel so as to output 8-bit data (data of one byte, i.e. one word) having a value of "0" for the pixels in the interior or in the exterior of the particle and having a non-zero value for the pixels on the boundary of the particle, sequentially in raster scan order.

The 8-neighbor pixel memory 11 has operation modes in two states. One is an operation at the time of image input and the other is an operation at the time of edge tracing. At the time of image input, the 8-neighbor pixel state values (i.e. the above values of either "0" or "8-bit data") are sequentially input in raster scan order. Namely, since the 8-neighbor pixel state values are sequentially outputted in raster scan order from the 8-neighbor pixel extracting filter 10 of the previous stage, the 8-neighbor pixel memory 11 receives and retains these 8-neighbor pixel state values. At the time of edge tracing, the 8-neighbor pixel memory 11 outputs an 8-neighbor pixel state value retained at the address indicated by the edge-tracing section 12 of the next stage along the boundary of the particle.

The edge-tracing section 12 traces the edge (also referred to as a "boundary" or an "outline") pixel by pixel by referring to the contents stored in the 8-neighbor pixel memory 11 and outputs a chain code representing the boundary of the particle. The method used in tracing the edge of the particle will be detailed later.

The characteristic parameter extracting section 13 determines and outputs characteristic parameters such as a perimeter or an area of the particle on the basis of the chain code which is outputted by the edge-tracing section 12 of the previous stage and which represents the boundary of the particle.

The microcomputer 4 controls each of the elements in the image processor 3 appropriately. Also, the microcomputer 4 temporarily stores the parameters such as a perimeter or an area for each pixel, performs a statistical processing on the parameters, and outputs the obtained data to a CRT display device 5, which displays the result of the statistical processing.

The external storage device 6 stores a program for controlling the microcomputer 4, namely, a program for controlling the apparatus for determining the boundary of an object according to the present invention by means of the microcomputer 4. Also, the external storage device 6 stores the characteristic parameters of the particles and the result of statistical processing obtained in the image processor 3.

The external storage device 6 may be a hard disk drive unit for writing and reading data into and from a hard disk, or a floppy disk drive unit for writing and reading data into and from a floppy disk. The external storage device 6 may alternatively be a storage device commonly used with other devices, such as a file server connected through a communication line. The controlling program for determining the boundary of an object is loaded from this external storage device 6 and is then executed on a main memory of the microcomputer 4.

Next, a process performed by the above-mentioned 8-neghborhood pixel extracting filter 10 is now detailed. In the process performed by the 8-neighbor pixel extracting filter 10, the following logical operation is carried out during the scanning period of one raster scan.

As shown in FIG. 2, eight neighbor pixels n0, n1, n2, n3, n4, n5, n6, and n7 are defined in an anti-clockwise direction from the position of 3 o'clock around the object pixel n8 located at the center. The result (a) obtained by an operation of the following logical formula is then stored as 8-bit data at a location corresponding to the object pixel n8 in the 8-neighbor pixel memory 11.

$$a = n8 \& \overline{(n0 \# n1 \# n2 \# n3 \# n4 \# n5 \# n6 \# n7)} \& nj$$

(where # represents a logical sum, & represents a logical product, ‾ represents a negation, and nj represents a binary representation of "n7n6n5n4n3n2n1n0").

Specifically, the value (a) is obtained by taking an "AND" (logical product) of n8, $\overline{(n0 \# n1 \# n2 \# n3 \# n4 \# n5 \# n6 \# n7)}$, and nj, which value (a) has the following meaning.

The first term in the right hand side of the equation shows that the object pixel is on the boundary or in the interior of the object. The second term shows that none of the pixels surrounding the object pixel has a value of "1" and only the object pixel has a value of "1", so that the object pixel is not chained to any other pixel. The third term shows that the states of the eight pixels (the binary values in the eight pixels) surrounding the object pixel are retained as they are.

In other words, if the object pixel has a value of "0", it is regarded as a background and a value "0" is assigned to (a) irrespective of the values of the eight neighboring pixels. If all of the eight neighboring pixels have a value of "0", the object pixel is regarded as a dust or the like and a value "0" is assigned to (a), even if the object pixel has a value of "1".

Consequently, only the object pixels having a non-zero value under the above logical condition are regarded as pixels located on the boundary or in the interior of the particle. Therefore, only the pixels in the background have a value of "0" and the pixels located on the boundary or in the interior of the particle each have a value of (a)=nj, which is a non-zero value. Thus, if an object pixel is located on the boundary or in the interior of the particle, the values (binary values of "1" or "0") representing the states of the eight neighboring pixels surrounding the object pixel are stored as an 8-neighbor pixel state value of 8-bit data at a location corresponding to the object pixel in the 8-neighbor pixel memory 11.

For example, if the eight neighboring pixels nj (j=0 to 7) including the object pixel n8 have a binary (two-valued) state as shown in FIG. 3, nj will be "n7n6n5n4n3n2n1n0", i.e. "11111000", so that the value of $(11111000)_B$, i.e. 0x"F8", will be stored at a location corresponding to the object pixel n8 in the 8-neighbor pixel memory 11. Here, "$()_B$" is a symbol showing that the value is a binary number (a binary code), and "0x" or "$()_H$" is a symbol showing that the value is a hexadecimal number (a hexadecimal code).

In this manner, with respect to the image after the binarization, the particles contained in the image are extracted by the above technique and the circumstances surrounding the object pixel located on the boundary or in the interior of the particle are retained as an 8-neighbor pixel state value, thereby realizing an edge-tracing operation with a smaller circuit dimension as mentioned later.

Here, a term (n0&n2&n4&n6) may be added on the right hand side of the above logical formula to extract only the pixels located on the boundary of the particle. Namely, the logical formula may be:

a=n8&(n0#n1#n2#n3#n4#n5#n6#n7)&!(n0&n2&n4&n6)&nj which is an "AND" (logical product) of n8, (n0#n1#n2#n3#n4#n5#n6#n7), !(n0&n2&n4&n6), and nj.

In this case, a condition represented by the term (n0&n2&n4&n6) is added. Namely, if the neighboring pixels at the positions of 3 o'clock, 12 o'clock, 9 o'clock, and 6 o'clock as viewed in an anti-clockwise direction among the eight neighboring pixels have a value of "1", the object pixel is regarded as being located in the interior of the particle and "0" is assigned to (a), even if the object pixel has a value of "1" and any one of the eight neighboring pixels has a value of "1".

Accordingly, in this case, the pixels which are not on the boundary of the particle, namely the pixels in the interior or in the exterior of the particle, have a value of "0", and only the pixels on the boundary of the particle have a non-zero value of (a)=nj. Thus, only if an object pixel is located on the boundary of the particle, the values (binary values of "1" or "0") representing the states of the eight neighboring pixels surrounding the object pixel are stored as an 8-neighbor pixel state value of 8-bit data at a location corresponding to the object pixel in the 8-neighbor pixel memory 11.

In the edge-tracing section 12 of the next stage, only the pixels located on the boundary of the particle are traced. Accordingly, the pixels located in the interior of the particle do not have any influence on the edge-tracing whether they have an 8-neighbor pixel state value or a value of "0". However, by assigning a value of "0" to the pixels in the interior of the particle and assigning 8-neighbor pixel state values only to the pixels located on the boundary of the particle, error in finding the next chain directions can be avoided at the time of tracing the edge.

Figure 4:
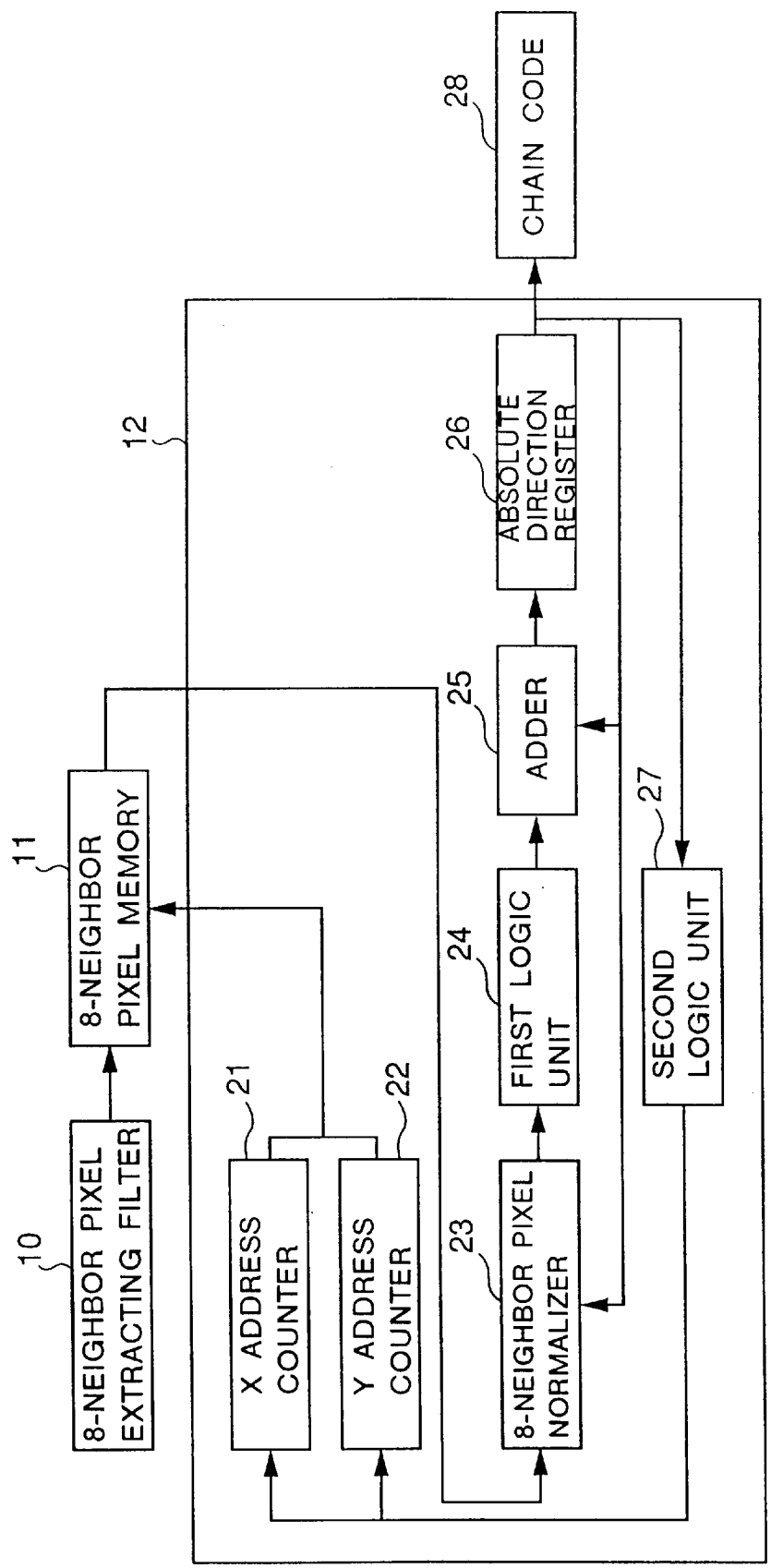
FIG. 4 is a block diagram showing a detailed construction of an edge-tracing section according to the present invention.

FIG. 4 is a block diagram showing a detailed construction of the edge-tracing section 12. Referring to FIG. 4, the edge-tracing section 12 includes an X address counter 21, a Y address counter 22, an 8-neighbor pixel normalizer 23, a first logic unit 24, an adder 25, an absolute direction register 26, and a second logic unit 27. The edge-tracing section 12 outputs a chain code 28 from the absolute direction register 26.

The X address counter 21 and the Y address counter 22 are up-and-down counters for designating the position from which data should be read in reading the data of the 8-neighbor pixel memory 11 by designating the coordinates of the pixel to be read. The X address counter 21 is for designating a value in the X direction corresponding to the lateral direction, and the Y address counter 22 is for designating a value in the Y direction corresponding to the longitudinal direction. In tracing the boundary of a particle, an instruction is given from the X address counter 21 and the Y address counter 22 to read from the 8-neighbor pixel memory 11 the 8-neighbor pixel state value stored at the address of the next boundary pixel to be chained to.

As described above, the 8-neighbor pixel memory 11 stores the output results of the 8-neighbor pixel extracting filter 10 of the previous stage as a two-dimensional image data in raster scan order at the time of image input. Subsequently, at the time of edge tracing, the 8-neighbor pixel state value which is stored at the address designated by the X address counter 21 and the Y address counter 22 is outputted.

Using a value stored in the absolute direction register 26 as a standard, the 8-neighbor pixel normalizer 23 rearranges the bit configuration "n7n6n5n4n3n2n1n0" of the 8-neighbor pixel state value stored in the 8-neighbor pixel memory 11 for output as a normalized neighbor pixel value.

The method employed in this rearrangement (normalization) will be explained later.

Provided that the normalized neighbor pixel value outputted from the 8-neighbor pixel normalizer 23 is n0, n1, n2, n3, n4, n5, n6, and n7, the first logic unit 24 performs the following operation.

$$d2=(!n0\&!n1\&!n2\&!n3) \#n6 \#n7;$$

$$d1=(!n0\&!n1\&n2)\# (!n0\&!n1\&n3)\#n6\#n7;$$

$$d0=(!n0\&n1\&!n6)\# (!n0\&!n2\& n3\&n6)\# (!n6\&n7);$$

(where # represents a logical sum, & represents a logical product, and ! represents a negation).

The value of d2, d1, and d0 obtained by this operation, i.e. (d2d1d0), shows the relative chain direction of the next boundary pixel. The first logic unit 24 outputs the value of d2, d1, and d0 as a relative chain direction value. Here, it is to be noted that n4 and n5 are not contained in the right hand side of any of d2, d1, and d0. This shows that n4 and n5 are not required in the calculation of the relative chain direction value.

Figure 5:
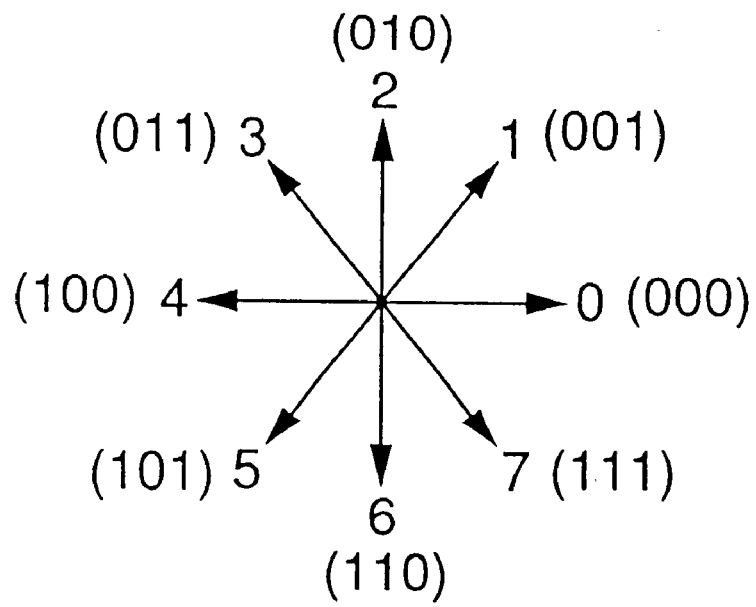
FIG. 5 is an explanatory view showing chain directions according to the present invention.

In order to explain the chain direction, FIG. 5 shows the directions indicated by the binary numbers (d2d1d0)B and the directions indicated by decimal numbers obtained by conversion of the binary numbers. Since the number of directions which the object pixel is chained to is eight, the directions are shown by the numerals 0 to 7 in an anti-clockwise direction with the direction of 3 o'clock being represented by "0". These numerals indicating the directions are referred to as "chain codes".

For example, if $(d2d1d0)_B$ is $(011)_B$, the chain direction is the direction of "3". If $(d2d1d0)_B$ is $(010)_B$, the chain direction is the direction of "2". However, the value outputted from the first logic unit 24 is a relative chain direction value obtained by using the value in the absolute direction register 26 as a standard.

The adder 25 adds the relative chain direction value outputted from the first logic unit 24 and the absolute chain direction value stored in the absolute direction register 26 so as to output the result as an absolute chain direction value indicating the next boundary pixel. The adder 25 is a 3-bit adder and assumes only eight values from $(000)_B$ to $(111)_B$.

For example, if a value $(011)_B=3$ is stored in the absolute direction register 26 and $(d2d1d0)_B$ obtained by the above logical formula is $(010)_B=2$, then the output of the adder 25 will be $(011)_B+(010)_B=(101)_B$, so that the absolute chain direction value of the next boundary pixel will be the direction of "5".

Further, if a value $(101)_B=5$ is stored in the absolute direction register 26 and $(d2d1d0)_B$ obtained by the above logical formula is $(111)_B=7$, then the output of the adder 25 will be $(101)_B+(111)_B=(100)_B$ because only the three least significant bits are outputted, so that the absolute chain direction value of the next boundary pixel will be the direction of "4".

The absolute direction register 26 retains the absolute chain direction value of the next boundary pixel outputted from the adder 25.

The chain code 28 is a data series outputted by the absolute direction register 26. By using the data series of these absolute chain direction values of the boundary pixels as a chain code of the boundary of the particle, the characteristic parameters of the particle are calculated at the next stage.

Figure 6:
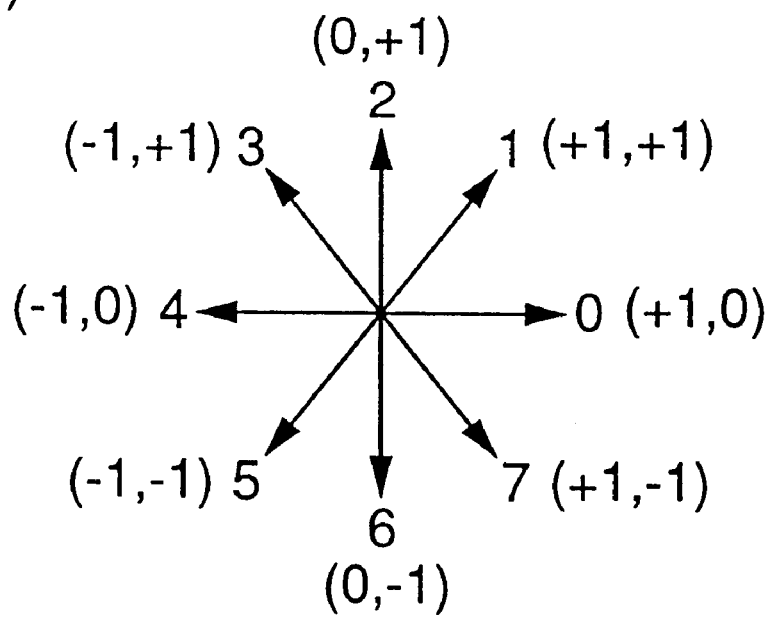
FIG. 6 is an explanatory view showing a relationship between the chain directions and the increment/decrement values of the X, Y address counters according to the present invention.

The second logic unit 27 indicates increment/decrement values, as shown in FIG. 6, to the X address counter 21 and the Y address counter 22 on the basis of the absolute chain direction value of the next boundary pixel. Specifically, if the absolute chain direction value is "0", the coordinate values of (X, Y)=(+1, 0) will be given as the increment/decrement values. Similarly, if the absolute chain direction value is "1", (X, Y)=(+1, +1) will be given; if "2", (0, +1) will be given; if "3", (−1, +1) will be given; if "4", (−1, 0) will be given; if "5", (−1, −1) will be given; if "6", (0, −1) will be given; and if "7", (+1, −1) will be given as the increment/decrement values.

Next, the process in the above 8-neighbor pixel normalizer 23 is explained. Namely, an explanation is now specifically given on the process in which the bit configuration in the 8-neighbor pixel state value stored in the 8-neighbor pixel memory 11 is rearranged and normalized using the previous chain direction as a starting point and is converted into the next chain code.

As shown by an example in FIGS. 7(a) to 7(h), the relationship of the eight neighboring pixels adjacent to the object pixel in the surrounding eight directions is often a symmetry of 4 times or sometimes a symmetry of 8 times. For example, if the bit configuration of the 8-neighbor pixel state value of FIG. 7(a) is shifted once in an anti-clockwise direction, the bit configuration of FIG. 7(b) is obtained. Similarly, if FIG. 7(b) is shifted once, FIG. 7(c) is obtained; if FIG. 7(c) is shifted once, FIG. 7(d) is obtained; if FIG. 7(d) is shifted once, FIG. 7(e) is obtained; if FIG. 7(e) is shifted once, FIG. 7(f) is obtained; if FIG. 7(f) is shifted once, FIG. 7(g) is obtained; and if FIG. 7(g) is shifted once, FIG. 7(h) is obtained.

Thus, in the example shown by FIGS. 7(a) to 7(h), the relationship of the eight neighboring pixels adjacent to the object pixel is a symmetry of 8 times. By performing a logical compression with this symmetry in mind, the dimension of the logic circuit required in calculating the next chain direction for edge tracing can be reduced to ¼ to ⅛.

For such reduction of the dimension of the logic circuit, the 8-neighbor pixel normalizer 23 shifts the bit configuration of the 8-neighbor pixel state value in the following manner.

For example, if the bit configuration of the 8-neighbor pixel state value is a configuration shown in FIG. 8 and if the direction from which the previous pixel has chained to the object pixel located at a blank portion in the center is a direction of "0", i.e. if the previous chain code is "0", then the bit configuration of the 8-neighbor pixel state value remains as it is without being shifted, as shown in FIG. 9(a).

If the previous chain code is "1", the bit values of n0 to n7 are taken out in an anti-clockwise direction from the direction of "1" with respect to the object pixel (See FIG. 9(b)). Similarly, if the previous chain code is "2", the bit values of n0 to n7 are taken out in an anti-clockwise direction from the direction of "2" with respect to the object pixel (See FIG. 9(c)); if the previous chain code is "3", the bit values of n0 to n7 are taken out in an anti-clockwise direction from the direction of "3" with respect to the object pixel (See FIG. 9(d)); if the previous chain code is "4", the bit values of n0 to n7 are taken out in an anti-clockwise direction from the direction of "4" with respect to the object pixel (See FIG. 9(e)); if the previous chain code is "5", the bit values of n0 to n7 are taken out in an anti-clockwise direction from the direction of "5" with respect to the object pixel (See FIG. 9(f)); if the previous chain code is "6", the bit values of n0 to n7 are taken out in an anti-clockwise direction from the direction of "6" with respect to the object pixel (See FIG. 9(g)); and if the previous chain code is "7", the bit values of n0 to n7 are taken out in an anti-clockwise direction from the direction of "7" with respect to the object pixel (See FIG. 9(h)).

For example, if the eight neighboring pixels adjacent to the object pixel have binary values shown in FIG. 10, the 8-neighbor pixel state value of the object pixel before the normalization is as follows. Namely, since the binary values are sequentially assigned to n0, n, . . . , n7 in an anti-clockwise direction from the position of 3 o'clock, the 8-neighbor pixel state value of the object pixel before the normalization is:

(n7, n6, n5, n4, n3, n2, n1, n0)=(1, 1, 1, 0, 0, 0, 0, 0).

Figure 11:
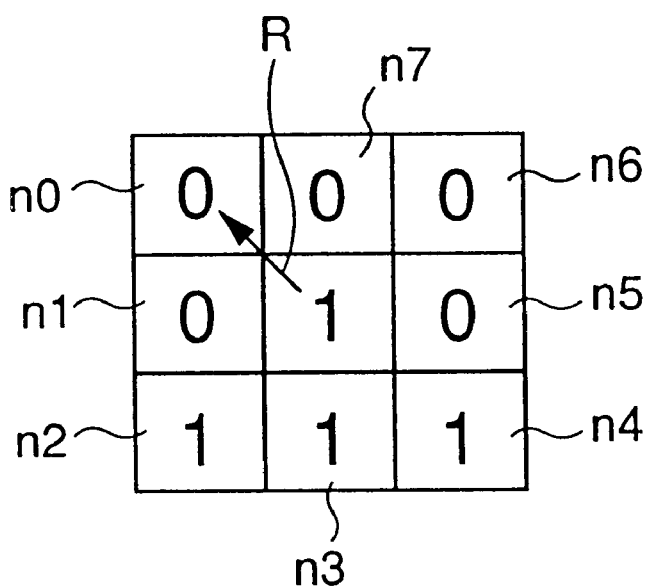
FIG. 11 is an explanatory view of an example of the values of the 8-neighbor pixels after normalization according to the present invention.

Provided that the direction from which the previous pixel has chained to the object pixel, i.e. the previous chain direction, is the direction of "3" (shown by an arrow R in FIG. 10), the normalized neighbor pixel value obtained from the above 8-neighbor pixel state value by normalization with respect to the direction of "3" will be as follows. Namely, since the binary values are assigned to n0, n, . . . , n7 in an anti-clockwise direction using the direction of "3" as a standard with respect to the object pixel, the normalized neighbor pixel value will be:

(n7, n6, n5, n4, n3, n2, n1, n0)=(0, 0, 0, 1, 1, 1, 0, 0), as shown in FIG. 11.

Figure 12:
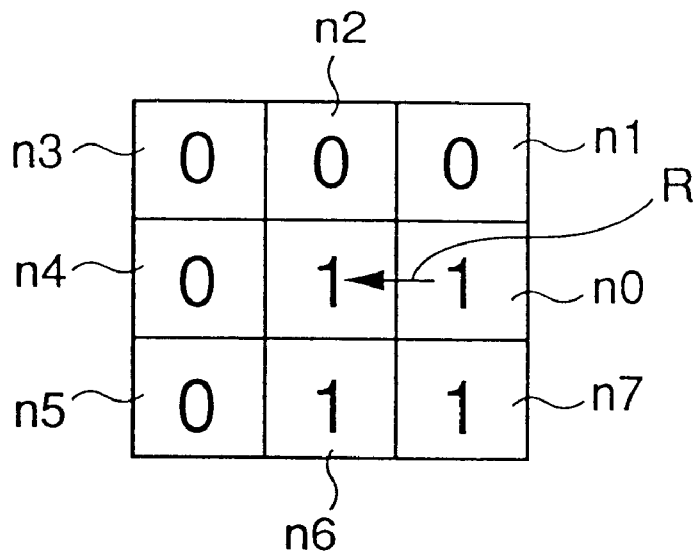
FIG. 12 is an explanatory view of an example of the values of the 8-neighbor pixels before normalization according to the present invention.

Similarly, if the eight neighboring pixels adjacent to the object pixel have binary values shown in FIG. 12, the 8-neighbor pixel state value of the object pixel before the normalization is:

(n7, n6, n5, n4, n3, n2, n1, n0)=(1, 1, 0, 0, 0, 0, 0, 1).

Figure 13:
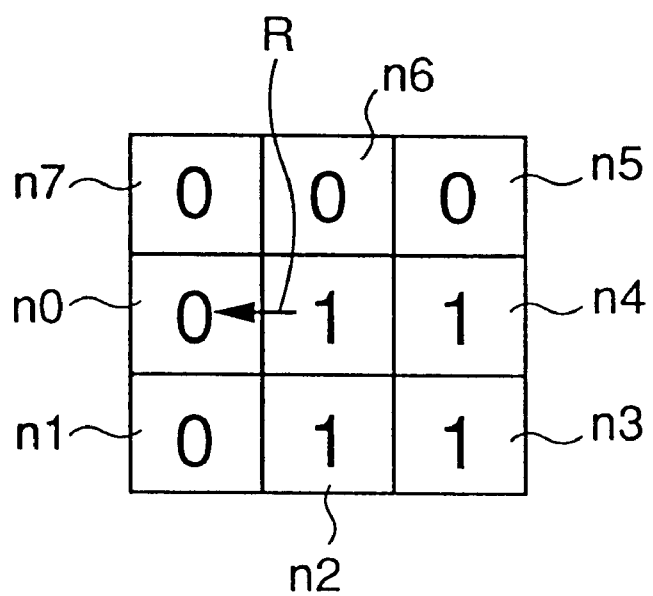
FIG. 13 is an explanatory view of an example of the values of the 8-neighbor pixels after normalization according to the present invention.

Provided that the previous chain direction is the direction of "4" (shown by an arrow R in FIG. 12), the normalized neighbor pixel value obtained from the above 8-neighbor pixel state value by normalization with respect to the direction of "4" will be:

(n7, n6, n5, n4, n3, n2, n1, n0)=(0, 0, 0, 1, 1, 1, 0, 0), as shown in FIG. 13.

Figure 10:
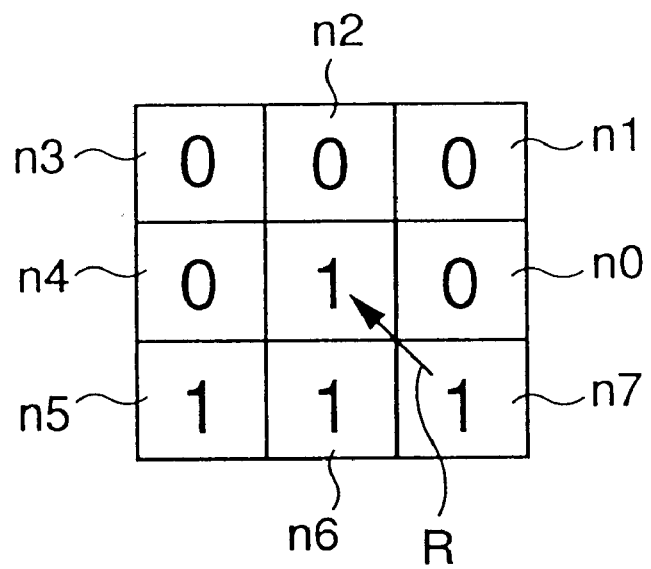
FIG. 10 is an explanatory view of an example of the values of the 8-neighbor pixels before normalization according to the present invention.

Thus, by performing the normalization relative to the previous chain direction, the 8-neighbor pixel state value shown in FIG. 10 and the 8-neighbor pixel state value shown in FIG. 12 will be converted into the same value in spite of the fact that the binary states of the eight pixels adjacent to the object pixel are different. This shows that, from a relative point of view, the configuration of eight neighboring pixels is the same for both cases. Therefore, by adopting this relative chain direction, the number of chain direction patterns can be greatly reduced, whereby the dimension of the logic circuit in the first logic unit 24 of the next stage can be greatly compressed.

Next, an explanation is now given on the process in the first logic unit 24 when it receives data from the 8-neighbor pixel normalizer 23.

FIG. 14 is an explanatory view showing truth values of logic operation in the first logic unit 24 and shows a relationship between the normalized neighbor pixel value outputted from the 8-neighbor pixel normalizer 23 and the relative chain direction value outputted from the first logic unit 24.

For example, if the normalized neighbor pixel value outputted from the first logic unit 24 is: (n7, n6, n5, n4, n3, n2, n1, n0)=(0, 0, 0, 1, 1, 1, 0, 0) as described above, this value is 0×1C, so that the relative chain direction value will be (0, 1, 0) which indicates the direction of "2". This means that, at the object pixel, the direction of advancement will be rotated in an anti-clockwise direction by 90° relative to the previous chain direction of the boundary.

Thus, the first logic unit 24 calculates the relative chain direction value (d2, d1, d0) by the above logical operation using the normalized neighbor pixel value n0, n1, n2, n3, n4, n5, n6, and n7 outputted from the 8-neighbor pixel normalizer 23. Here, since the 8-neighbor pixel values are normalized, the normalized neighbor pixel values take only 19 patterns as shown in FIG. 14, so that the relative chain directions take seven values 0, 1, 2, 3, 4, 6, and 7. Thus, an extremely simplified logical operation is achieved.

The relative chain direction values 0 to 7 indicate the next relative chain directions in which the object pixel is chained to the next boundary pixel. Namely, the direction "0" indicates that the direction of next advancement is the same as the previous chain direction; the direction "1" indicates that the direction of advancement is rotated in an anti-clockwise direction by 45° relative to the previous chain direction; the direction "2" indicates that the direction of advancement is rotated in an anti-clockwise direction by 90° relative to the previous chain direction; the direction "3" indicates that the direction of advancement is rotated in an anti-clockwise direction by 135° relative to the previous chain direction; the direction "4" indicates that the direction of advancement is rotated in an anti-clockwise direction by 180° relative to the previous chain direction; the direction "6" indicates that the direction of advancement is rotated in an anti-clockwise direction by 270° relative to the previous chain direction; and the direction "7" indicates that the direction of advancement is rotated in an anti-clockwise direction by 315° relative to the previous chain direction.

Figure 15:
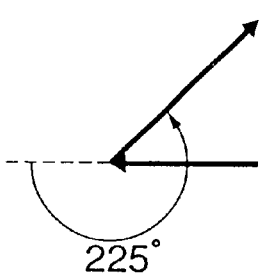
FIGS. 15(a) and 15(b) are explanatory views showing a case in which the direction of advancement is rotated by 225° relative to the previous chain direction of the boundary according to the present invention.
Figure 15:
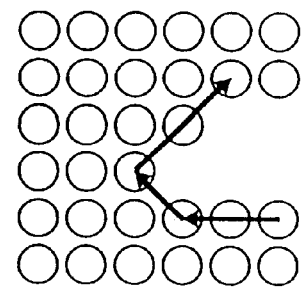
Figure 16:
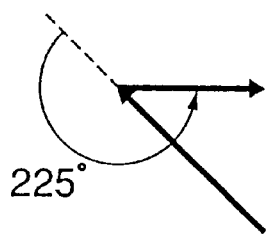
FIGS. 16(a) and 16(b) are explanatory views showing a case in which the direction of advancement is rotated by 225° relative to the previous chain direction of the boundary according to the present invention.
Figure 16:
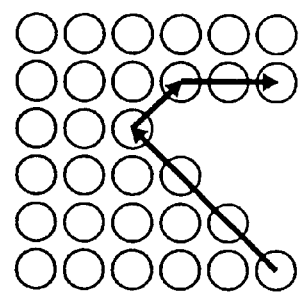

For reference, it is to be noted that the outputted relative chain direction values (d2, d1, d0) do not include the value of "5". This value indicates that the direction of advancement is rotated in an anti-clockwise direction by 225° relative to the previous chain direction of the boundary, as shown in FIGS. 15(a) and 16(a). However, as shown in FIGS. 15(b) and 16(b), in tracing the boundary of an object in an anti-clockwise direction, the direction of advancement cannot be rotated by 225°. Hence, the outputted relative chain direction values do not include the value of "5".

Figure 17:
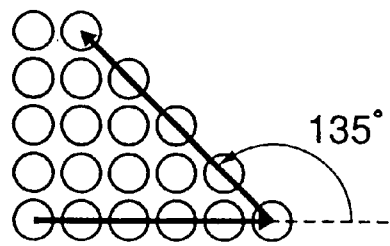
FIGS. 17(a) and 17(b) are explanatory views showing a case in which the direction of advancement is rotated by 135° relative to the previous chain direction of the boundary according to the present invention.
Figure 17:
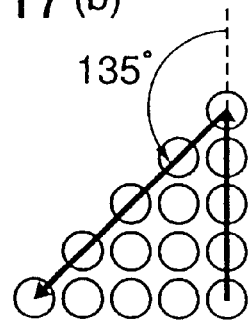

On the contrary, the direction of "3", which is symmetric with the direction of "5", indicates that the direction of advancement is rotated in an anti-clockwise direction by 135° relative to the direction in which the boundary is traced, as shown in FIGS. 17(a) and 17(b). Therefore, the direction of "3" is possible.

The direction of "4" indicates that the direction of advancement is rotated by 180°, which means that the chain goes back in the previous direction. The advancement in this direction is possible if the object is shaped like a line or a rod.

By means of the logical operation as described above, the edge-tracing section 12 searches for a next pixel to be chained to and continues tracing the pixels as long as the 8-neighbor pixel state value of the sought pixel is effective (i.e., non-zero). The edge-tracing section 12 continues tracing the boundary of the object until the coordinates of a sought pixel coincides with those of the starting pixel.

Namely, the edge-tracing section 12 rearranges and normalizes the 8-neighbor pixel state value using the previous chain direction immediately prior to the object pixel as a starting direction for normalization to output the next chain direction in a relative angle with respect to the previous chain direction instead of an absolute angle. Therefore, the boundary of an object can be traced by a logic circuit having a much smaller dimension than that of a conventional method using a look-up table, so that the logic circuit for tracing the boundary can be integrated easily by using a gate array or the like.

Figure 18:
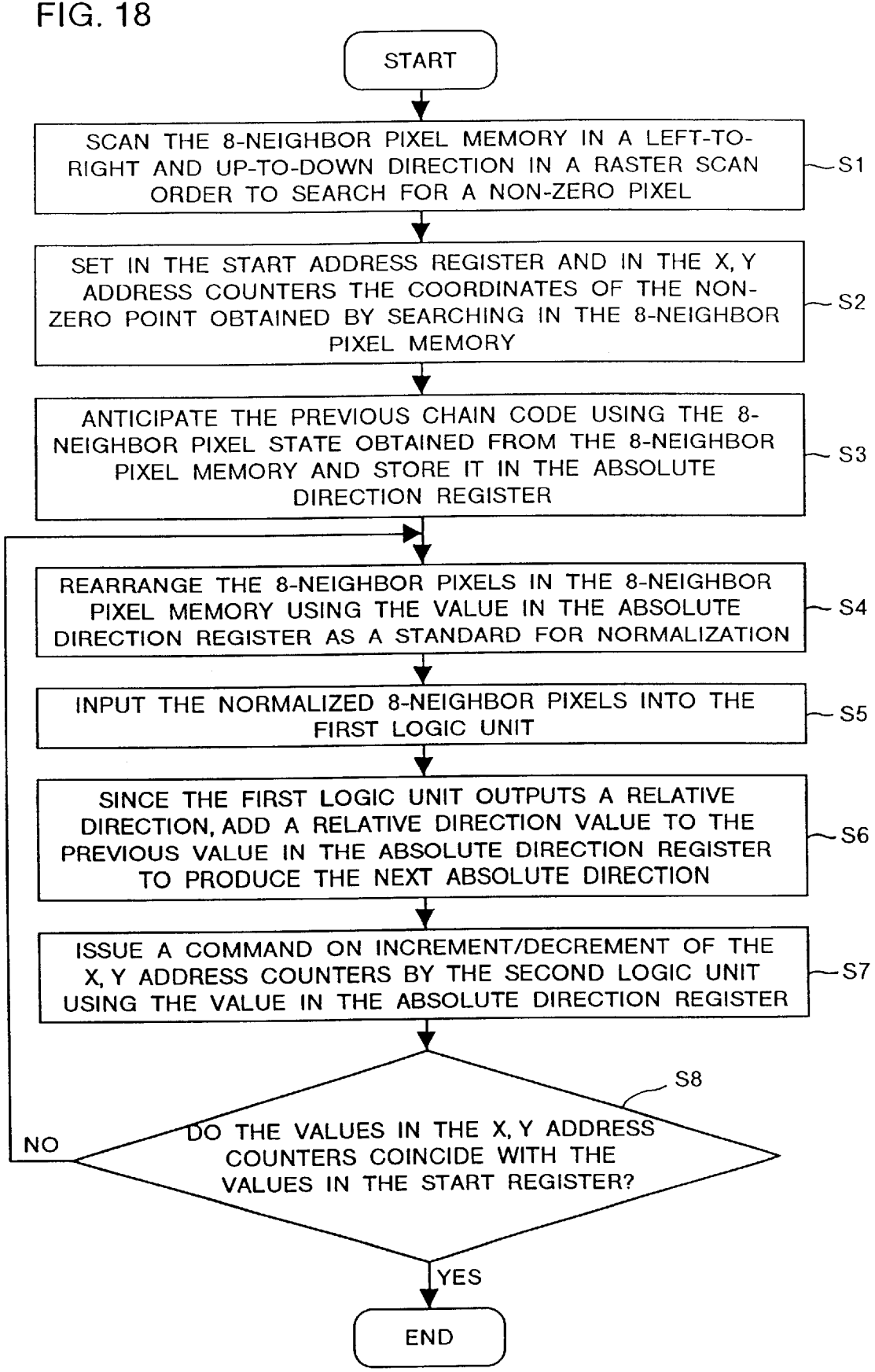
FIG. 18 is a flow chart showing an operation of the process in performing the edge-tracing according to the present invention.

The operation of an apparatus constructed as above for determining the boundary of an object is now explained with reference to a flowchart shown in FIG. 18.

First, the microcomputer 4 captures an image of the object, which is a particle such as a blood corpuscle contained in blood or a cell contained in urine, by means of a video camera 2. An analogue video signal of the captured image of the particle is inputted into the image processor 3. In the image processor 3, the digitizer 7 performs an A/D conversion on the analogue video signal.

FIG. 19 is an explanatory view of an example of a gray-scale image. In FIG. 19, a gray scale image obtained by the A/D conversion is shown in 65 scales from 0 to 64. The digitizer 7 outputs the gray-scale image successively in raster scan order.

Then, the comparator 8 filters the pixels in the gray-scale image into two levels and stores the obtained binary values in the binary image retaining memory 9. FIG. 20 is an explanatory view of an example of stored contents in the binary image retaining memory 9. Here, the pixels in the gray-scale image is binarized using a threshold value of "25".

Next, the 8-neighbor pixel extracting filter 10 performs a logical operation on the binary values of the eight neighboring pixels surrounding the object pixel to calculate an 8-neighbor pixel state value of the object pixel and stores it in the 8-neighbor pixel memory 11.

Figures 21, 22:
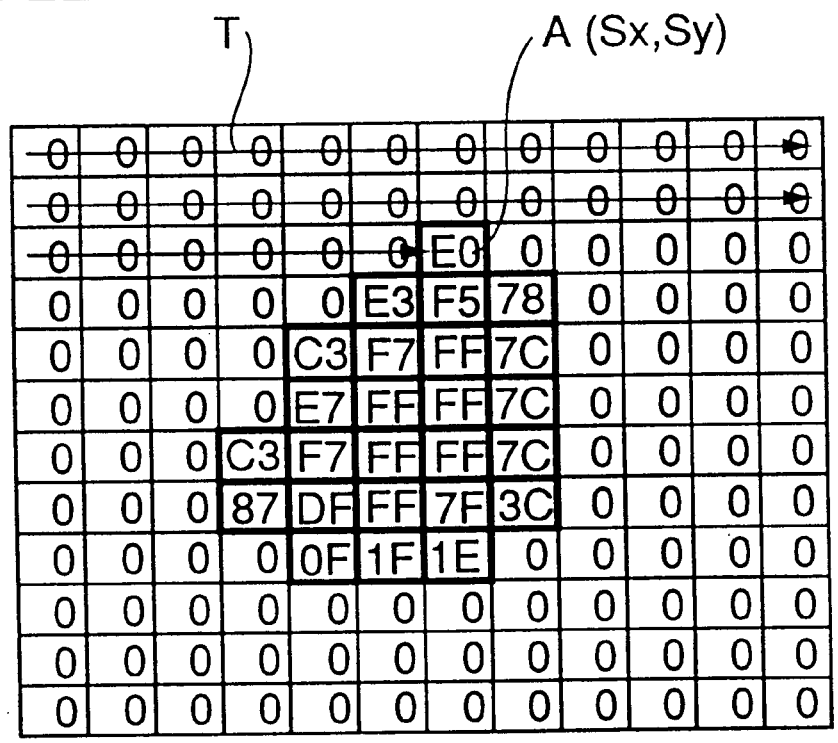
FIG. 21 is an explanatory view of an example of stored contents in the 8-neighbor pixel memory according to the present invention.
FIG. 22 is an explanatory view showing how a raster scan of the 8-neighbor pixel memory is performed according to the present invention.

FIG. 21 is an explanatory view of an example of stored contents in the 8-neighbor pixel memory 11. FIG. 21 shows a case in which the pixels in the background are represented by a value of "0" and the pixels on the boundary or in the interior of the particle are represented by a non-zero value. The operations up to this step are for image input and the subsequent operations are for edge tracing.

In tracing the edge, the edge-tracing section 12 traces the edge of the particle pixel by pixel with reference to the contents stored in the 8-neighbor pixel memory 11 and outputs a chain code. Then, the characteristic parameter extracting section 13 calculates characteristic parameters such as a perimeter or an area of the particle from the chain code.

The processing operations for tracing the edge are now explained with reference to the flowchart shown in FIG. 18.

First, the microcomputer 4 sequentially accesses the 8-neighbor pixel memory 11 having a two-dimensional data in a direction from up-left to down-right in a raster scan order, as shown by arrow T in FIG. 22, to search for a non-zero point (pixel) (step S1). In FIG. 22, the point (A) having a value of $(E0)_H$ is found.

Next, the X, Y addresses of the point (A) having a value of $(E0)_H$, which has been found first by the raster scan, are set in the start address register and the X, Y address counters 21, 22 as starting addresses (Sx, Sy) (step S2). Here, the start address register is installed beforehand in the X, Y address counters 21, 22.

Further, by making a reference to the address indicated by the X, Y address counters 21, 22, the microcomputer 4 reads the 8-neighbor pixel state value of the object pixel from the 8-neighbor pixel memory 11 and conjectures the previous chain code of the object pixel on the basis of the 8-neighbor pixel state value. The conjectured chain code is then stored in the absolute direction register 26 (step S3). Here, the conjecture of the previous chain code to the first object pixel may be carried out by a conventional method.

Figures 23, 24:
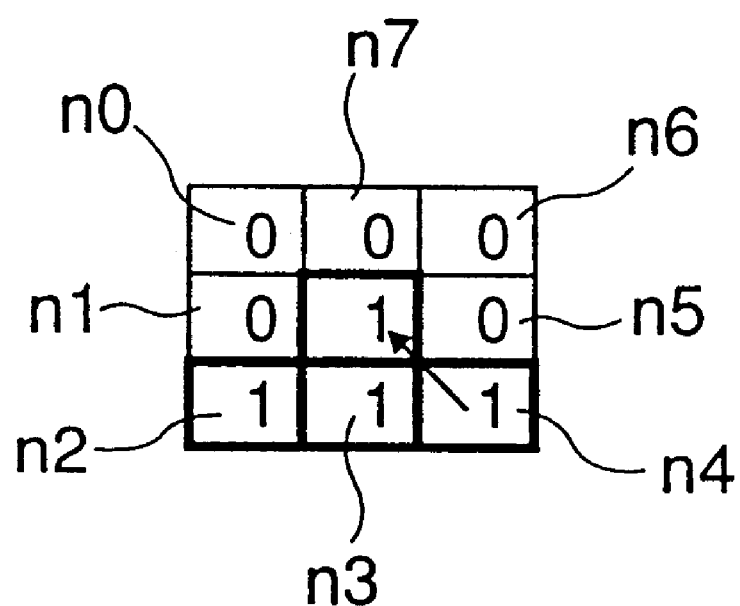
FIG. 23 is an explanatory view showing values of the 8-neighbor pixels when the object pixel has a value of $(E0)_H$ according to the present invention.
FIG. 24 is an explanatory view of a bit configuration after the values of the 8-neighbor pixels adjacent to the object pixel having a value of $(E0)_H$ are rearranged according to the present invention.

In this conventional method, the chain directions and the chain codes are defined, for example, as shown in FIG. 5. If the 8-neighbor pixel state value of the object pixel obtained from the 8-neighbor pixel memory 11 is (E0)H=(1, 1, 1, 0, 0, 0, 0, 0)$_B$, the states of the eight neighboring pixels surrounding the object pixel are as shown in FIG. 23. From these states, the previous chain direction is conjectured as being the direction of "3", as shown by an arrow in FIG. 24, and the conjectured direction "3" is then set in the absolute direction register 26.

Subsequently, using the value stored in the absolute direction register 26 as a standard, the 8-neighbor pixel normalizer 23 rearranges and normalizes the eight neighboring pixels of the object pixel, which have been read from the 8-neighbor pixel memory 11 (step S4).

For example, if the 8-neighbor pixel state value represented by (E0)H=(1, 1, 1, 0, 0, 0, 0, 0)$_B$ is rearranged and normalized using the direction of "3" stored in the absolute direction register 26 as a starting direction, the obtained new 8-neighbor pixel state value would be (0, 0, 0, 1, 1, 1, 0, 0)$_B$ as shown in FIG. 24. The process for this rearrangement can be easily carried out by providing a conventional known multiplexer.

Next, the normalized neighbor pixel value outputted from the 8-neighbor pixel normalizer 23 is inputted into the first logic unit 24 to obtain a relative chain direction value as shown in FIG. 14 (step S5).

For example, when a value of (0, 0, 0, 1, 1, 1, 0, 0)$_B$, i.e. 0x1C, is inputted as (n7, n6, n5, n4, n3, n2, n1, n0), the output would be (d2, d1, d0)=(0, 1, 0). Namely, the relative chain direction value indicating the next chain direction is the direction of "2" (in decimal number).

Next, the value in the absolute direction register 26 and the relative chain direction value which is the output of the first logic unit 24 are added in the adder 25 to obtain the absolute chain direction value indicating the next boundary pixel. The obtained new absolute chain direction value is then stored in the absolute direction register 26 (step S6). Here, it is to be noted that the adder 25 is a 3-bit adder. Accordingly, if the chain code exceeds 8 in decimal number, its remainder modulo 8 will be the next absolute chain direction value.

For example, if the value stored in the absolute direction register 26 is "3" and the relative chain direction value outputted from the first logic unit 24 is "2", the adder calculates 3+2=5, so that the absolute chain direction value indicating the next boundary pixel is "5". This value is then set in the absolute direction register 26 at the next clock cycle.

Thus, the absolute chain code of the next boundary is the sum of the absolute chain code of the previous boundary and the difference (the relative value) between the absolute chain code of the previous boundary and the absolute chain code of the next boundary.

Subsequently, in the second logic unit 27, the absolute chain direction value stored in the absolute direction register 26 is converted into an increment/decrement value as shown in FIG. 6 and this increment/decrement value is given to the X, Y address counters 21, 22 (step S7).

Figure 25:
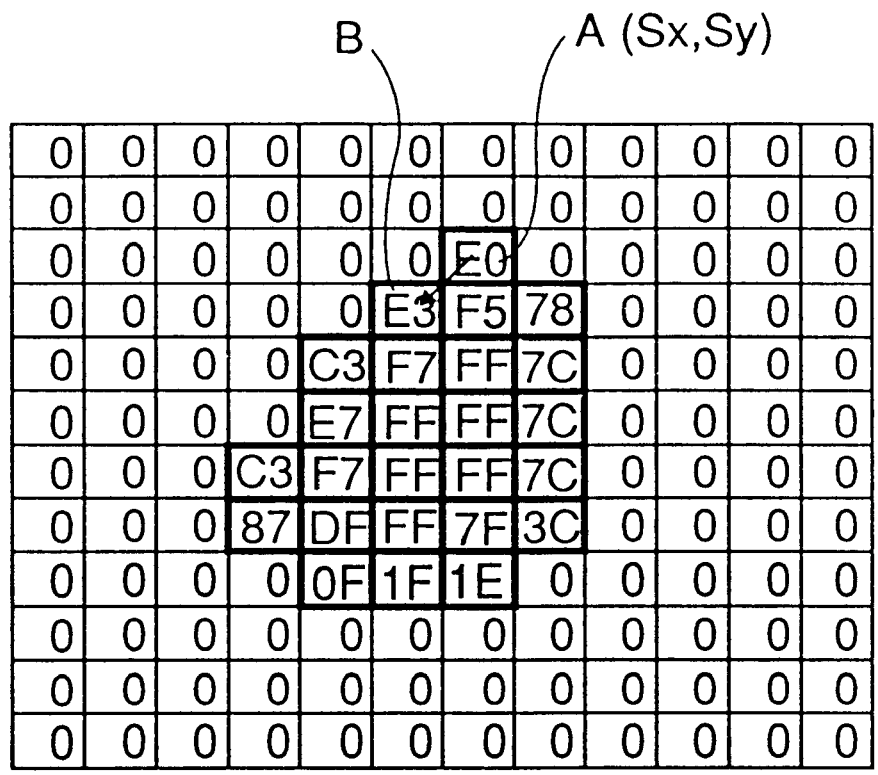
FIG. 25 is an explanatory view showing how the boundary is traced in the 8-neighbor pixel memory according to the present invention.

For example, if the value stored in the absolute direction register 26 is "5" as shown above, the increment/decrement value for X, Y is (−1, −1), which is given to the X, Y address counters 21, 22. Through this process, the trace of the boundary proceeds in the direction indicated by the relative chain direction value of "2" as shown by an arrow in FIG. 25, so that the next boundary pixel is a point (B) having a value of (E3)$_H$.

Next, the address indicated by the X, Y address counters 21, 22 is compared with the starting address (Sx, Sy) which is stored in the start address register and from which the tracing of the boundary of the particle has started (step S8).

Here, if the address indicated by the X, Y address counters 21, 22 is different from the starting address (Sx, Sy), the flow goes back to step S4 and the processes from step S4 to step S8 are repeated as many times as the number of pixels on the boundary.

Figure 26:
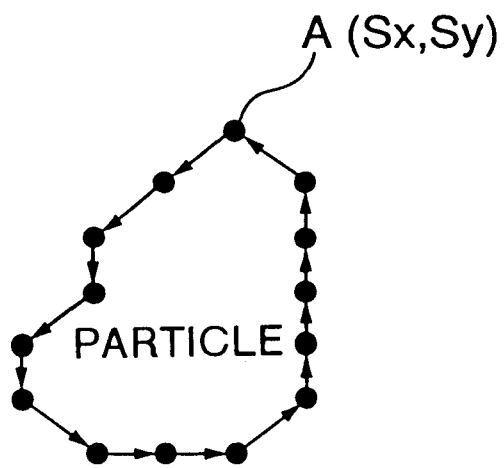
FIG. 26 is an explanatory view showing the state in which the edge-tracing is completed after traveling around along the boundary of a particle according to the present invention.
Figure 27:
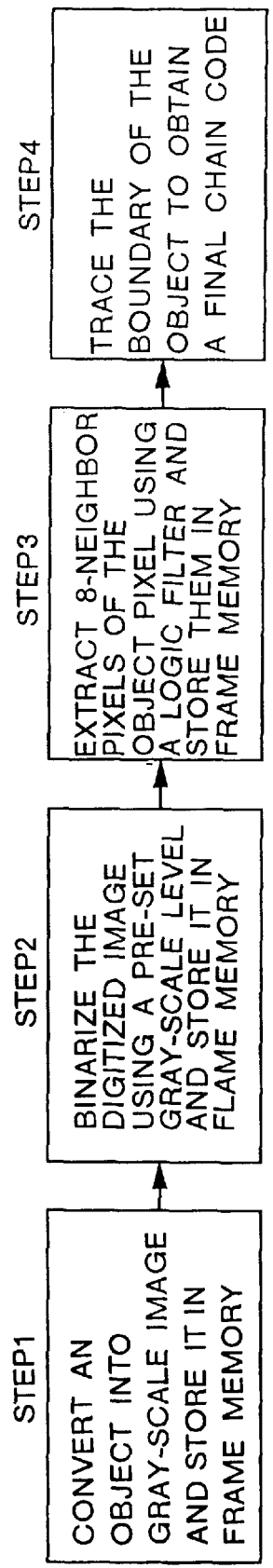
FIG. 27 is a block diagram showing a conventional method for tracing the boundary of an object.

On the other hand, if the address indicated by the X, Y address counters 21, 22 coincides with the starting address (Sx, Sy), the tracing of the edge is terminated because it has traveled around the particle along the boundary, as shown in FIG. 26. The data sequence of the values of the absolute direction register 26 from the start of the edge tracing to its end shows the chain code representing the boundary of the particle.

Thus, according to the present invention, the eight neighboring pixel states are rearranged using the previous chain code as a standard in view of the symmetry in the 8-neighbor pixel state values with respect to the direction of tracing the boundary. Therefore, the next chain direction can be calculated using the minimum number of parameters (6 bits). As a result, the chain codes can be calculated by means of simple logic operations and an adder only. Since the boundary can be traced using only such simple logic operations and a random logic, it is possible to achieve a high integration of the image processor (to about ¼ of the conventional one) and a great increase of speed in the image processing (ability to trace the boundary at a speed of 5 million pixels per second or more) as compared with the conventional microprogram logic methods.

The apparatus for determining the boundary of an object according to the present invention can be combined with an imaging flow cytometer for use as a flow particle image analyzer.

The flow particle image analyzer comprises: a flow cell through which particles flow; a light source for applying a light into the flow cell; an image capturing device for capturing images of the particles flowing through the flow cell by means of the light from the light source; an apparatus for determining the boundary of an object according to the present invention; and an analyzer for analyzing a shape of the object on the basis of data obtained by the apparatus for determining the boundary of the object.

Hereafter, an example will be shown in which images of the particles are captured by applying light to the particles flowing through the flow cell, and the obtained images are analyzed to calculate an area circle equivalent diameter and a circularity of each of the particles for analysis of particle shape by means of the flow particle image analyzer. The above-described morphological parameters were calculated from chain codes using a known technique.

FIGS. 28(a) to 28(e) are views showing a result of analysis of a kind of toner particles. In the graph shown in FIG. 28(a), the horizontal axis represents area circle equivalent diameters ($\mu$m) of particles. An area circle equivalent diameter is a diameter of a particle as obtained from the area of the particle by regarding the particle as a regular circle. A vertical axis on the left side represents frequencies (%) illustrated by bar chart in the graph, and a vertical axis on the right side represents cumulative frequencies (%) illustrated by a curved line in the graph.

Figure 28A:
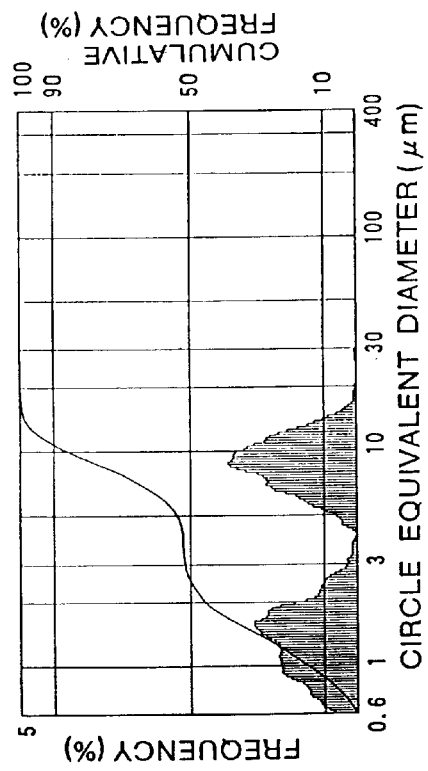
Figure 28B:
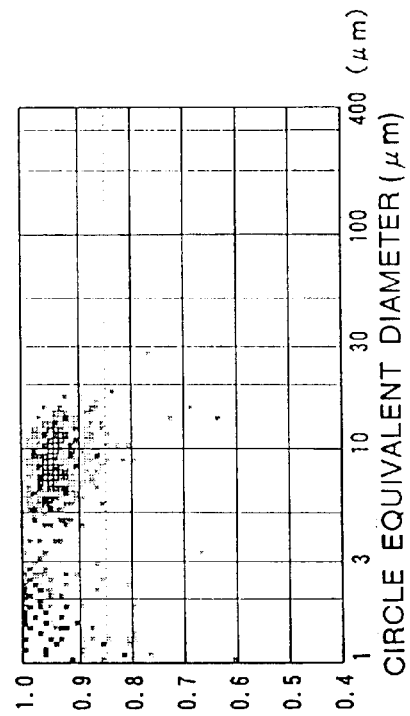

In the graph shown in FIG. 28(b), the horizontal axis represents area circle equivalent diameters similar to those of the horizontal axis of the graph shown in FIG. 28(a). The vertical axis represents circularities of the particles plotted in the graph. A circularity of a particle is a numeral which is 1.0 when the shape of the particle is a regular circle and which gradually decreases to 0.9, 0.8 . . . according as the shape of the particle is more deviated from the regular circle on the basis of a predetermined standard.

Figure 28C:
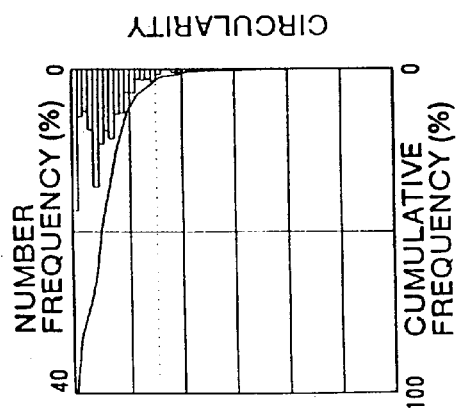
Figure 29A:
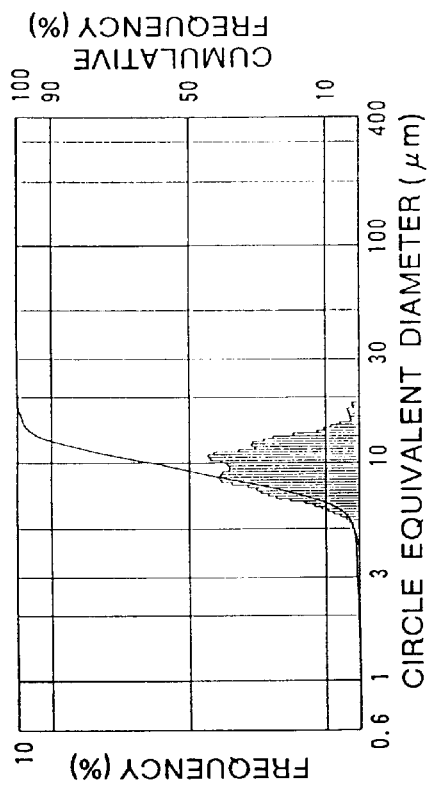
Figure 29B:
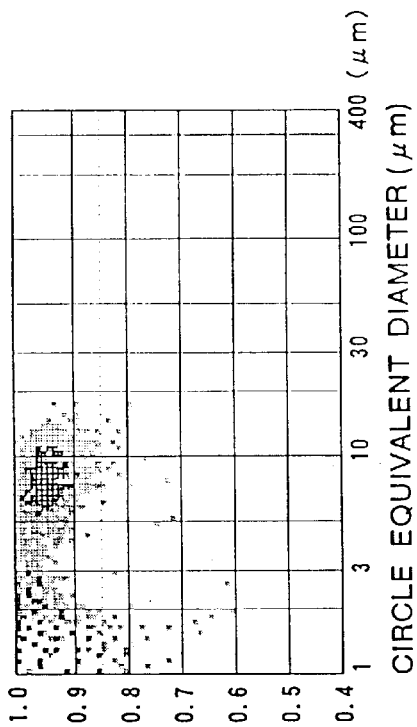
Figure 29C:
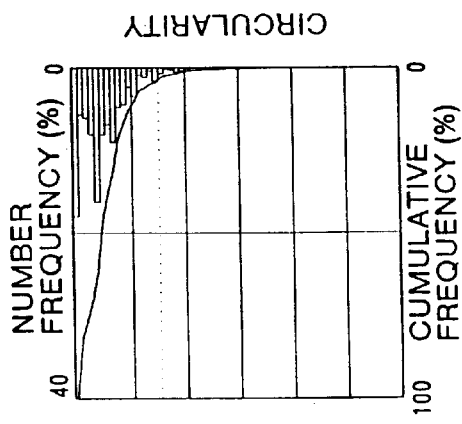

In the graph shown in FIG. 28(c), a vertical axis on the right side represents circularities similar to those of the vertical axis of the graph shown in FIG. 28(b). A horizontal axis on the top represents frequencies (%) illustrated by bar chart in the graph, and a horizontal axis on the bottom represents cumulative frequencies (%) illustrated by a curved line in the graph.

In the graphs shown in FIGS. 28(a) to 28(c), a group of particles having the larger area circle equivalent diameters represents toner particles, and the other group of particles having the smaller area circle equivalent diameters represents additives such as silica.

FIG. 28(d) shows a particle diameter frequency data table in which the particle diameters of the particles are classified into 57 ranges, whereby the frequency and the cumulative frequency of each range are shown. FIG. 28(e) shows a result of analysis. By carrying out this analysis, uniformity of the particle diameters of the toner particles could be examined, and the quality of the toner particles could be specifically determined.

FIGS. 29(a) to 29(e) are views showing a result of analysis of another kind of toner particles. The views shown in FIGS. 29(a) to 29(e) correspond to views shown in FIGS. 28(a) to 28(e), respectively.

FIGS. 30(a) to 30(e) are views showing a result of analysis of alumina particles which are ceramic particles. The views shown in FIGS. 30(a) to 30(e) correspond to views shown in FIGS. 28(a) to 28(e), respectively. By carrying out this analysis, uniformity of the particle diameters of a sintering powder could be examined, and the quality of the sintering powder could be specifically determined.

These could be realized by means of FPGA (Field Programmable Gate Array) having a relatively small capacity (several thousand gates).

Although the examples have been given for measuring toner particles and alumina particles, the object of measurement need not be limited to these, so that other industrial particles such as cosmetics and paints may also be measured using the flow particle image analyzer of the present invention. It goes without saying that particles from a living body, such as blood corpuscles contained in blood or cells contained in urine, may also be an object of measurement.

According to the present invention, in tracing the boundary of an object in an image captured by a video camera or the like, the absolute chain direction value indicating the next chain direction is calculated by determining the relative chain direction value of the pixel located on the boundary of the object using the previous chain direction as a standard. Accordingly, the dimension of the logic circuit can be made smaller than in the conventional methods, so that the logic circuit can be integrated easily with a gate array or the like. Also, the boundary can be traced rapidly.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A method for determining a boundary of an object based on its optically captured image, comprising the steps of:

(a) converting a density data of each of a plurality of pixels forming the captured image into a binary signal;

(b) converting the binary signal into a neighbor pixel state value so that only the pixels located on the boundary or in an interior of the object have a value corresponding to the binary signals of the surrounding pixels;

(c) normalizing the neighbor pixel state value using an absolute chain direction value of a previous chain direction;

(d) obtaining a relative chain direction value for pixel located on the boundary of the object in the image relative to the direction from which the chain has proceeded, with reference to the neighbor pixel state value of the pixel;

(e) calculating an absolute chain direction value of a next chain direction on the basis of the relative chain direction value; and (f) repeating the steps (c) to (e) for each pixel located on the boundary to trace the boundary of the object.

2. A method according to claim 1, wherein the object comprises industrial particles or powders including toner particles.

3. A method according to claim 1, wherein the object comprises particles from a living body inclusive of a human being including one of blood corpuscles contained in blood and cells contained in urine.

4. A method according to claim 1, wherein the density data of each pixel of the plurality of pixels comprises a video signal obtained by optically capturing an image of the object with a video camera.

5. A method according to claim 4, wherein the binary signal is a signal obtained by converting the video signal into a digital signal represented in a gray scale, and binarizing the digital signal into two levels by using a predetermined threshold value.

6. A method according to claim 1, wherein the neighbor pixel state values are obtained by conversion of the binary signals so that the neighbor pixel state value of each pixel located on the boundary or in the interior of the object is an 8-bit signal obtained by arranging in a predetermined order the binary signals of eight neighboring pixels around said each pixel.

7. A method according to claim 1, wherein the absolute chain direction value of the next chain direction is calculated by adding the relative chain direction value to the absolute chain direction value of the previous chain direction.

8. An apparatus for determining a boundary of an objected based on its optically captured image, comprising:

(a) a binarizing section for converting a density data of each of a plurality of pixels forming the captured image into a binary signal;

(b) a pixel extracting section for converting the binary signal into a neighbor pixel state value so that only the pixels located on the boundary or in the interior of the object have a value corresponding to the binary signals of the surround pixels; and (c) an edge-tracing section for obtaining a relative chain direction value for a pixel located on the boundary of the object in the image relative to the direction from which the chains has proceeded with reference to the neighbor pixel state value of the pixel obtained by conversion in the pixel extracting section, said edge-tracing section calculating an absolute chain direction value of a next chain direction on the basis of the relative chain direction value, said edge-tracing section including a neighbor pixel normalizer to normalize the neighbor pixel state value using an absolute chain direciton value of a previous chain direction, and said edge-tracing section obtaining the relative chain direction values and calculating the absolute chain direction values for each pixel located on the boundary to trace the boundary of the object.

9. An apparatus according to claim 8, wherein the object is an industrial particle or powder including a toner particle.

10. An apparatus according to claim 8, wherein the object comprises particles from a living body inclusive of a human being, and said particles include one of blood corpuscles contained in blood and cells contained in urine.

11. An apparatus according to claim 8, wherein the density data of each pixel of the plurality of pixels comprises a video signal obtained by optically capturing the image of the object with a video camera.

12. An apparatus according to claim 11, wherein the binarizing section converts the video signal into a digital signal represented in gray scale and binarizes the digital signal into two levels using a predetermined threshold value to obtain a binary signal.

13. An apparatus according to claim 8, wherein the pixel extracting section converts the binary signals into the neighbor pixel state values so that the neighbor pixel state value of each pixel located on the boundary or in the interior of the object is an 8-bit signal obtained by arranging in a predetermined order the binary signals of eight neighboring pixels around said each pixel.

14. An apparatus according to claim 8, wherein the edge-tracing section calculates the absolute chain direction value of the next chain direction by adding the relative chain direction value to the absolute chain direction value of the previous chain direction.

15. A computer-readable recording medium containing a computer program for determining a boundary of an object based on its optically captured image, the computer program performing the functions of:

(a) causing a computer operation to convert a density data of each of a plurality of pixels forming the captured image into a binary signal;

(b) causing a computer operation to convert the binary signal into a neighbor pixel state value so that only the pixels locate don the boundary or in the interior of the object have a value corresponding to the binary signals of the surrounding pixels;

(c) causing a computer operation to normalize the neighbor pixel state value by using an absolute chain direction value of a previous chain direction;

(d) causing a computer operation to obtain a relative chain direction value for a pixel of the image which is located on the boundary of the object relative to the direction from which the chain has proceeded with reference to the neighbor pixel state value of the pixel;

(e) causing a computer operation to calculate an absolute chain direction value of a next chain direction on the basis of the relative chain direction value; and (f) causing a computer operation to repeat the functions (c) to (e) for each pixel located on the boundary to trace the boundary of the object.

16. A flow particle image analyzer comprising:

a flow cell through which particles flow;

a light source for applying a light into the flow cell;

an image capturing device for capturing images of the particles flowing through the flow cell by means of the light from the light source;

an apparatus for determining a boundary of an object according to claim 8; and an analyzer for analyzing a shape of the object on the basis of data obtained by the apparatus for determining the boundary of the object.

17. The apparatus of claim 8, wherein the binary signal is obtained by filtration in the binarizing section.

18. A method according to claim 1, wherein none of steps (c) through (e) utilize a look-up table means, function or memory.

19. An apparatus according to claim 8, wherein said edge-tracing section does not utilize a look-up table memory.

20. A computer-readable recording medium according to claim 15, wherein none of functions (c) through (e) utilize a look-up table means, function or memory.

* * * * *